(12) United States Patent
Schultz et al.

(10) Patent No.: US 7,861,941 B2
(45) Date of Patent: Jan. 4, 2011

(54) AUTOMATIC THERMOSTAT SCHEDULE/PROGRAM SELECTOR SYSTEM

(75) Inventors: David A. Schultz, Savage, MN (US); Chad W. Koster, Lakeville, MN (US); Steven R. Hoglund, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1498 days.

(21) Appl. No.: 11/069,226

(22) Filed: Feb. 28, 2005

(65) Prior Publication Data
US 2006/0192021 A1 Aug. 31, 2006

(51) Int. Cl.
F24F 11/053 (2006.01)

(52) U.S. Cl. .......................... 236/1 C; 236/51; 236/94; 62/157

(58) Field of Classification Search .................. 236/1 C, 236/46 R, 46 C, 51, 94, 91 D; 62/157; 715/771; 165/201; 700/278
See application file for complete search history.

(56) References Cited

U.S. PATENT DOCUMENTS

| | | | |
|---|---|---|---|
| 4,079,366 A | 3/1978 | Wong | |
| 4,174,807 A | 11/1979 | Smith et al. | |
| 4,206,872 A | 6/1980 | Levine | |
| 4,224,615 A | 9/1980 | Penz | |
| 4,264,034 A | 4/1981 | Hyltin et al. | |
| 4,296,334 A | 10/1981 | Wong et al. | |
| 4,298,946 A | 11/1981 | Hartsell et al. | |
| 4,308,991 A | 1/1982 | Peinetti et al. | |
| 4,332,352 A | 6/1982 | Jaeger | |
| 4,337,822 A | 7/1982 | Hyltin et al. | |
| 4,337,893 A | 7/1982 | Flanders et al. | |
| 4,373,664 A | 2/1983 | Barker et al. | |
| 4,379,483 A | 4/1983 | Farley | |
| 4,382,544 A | 5/1983 | Stewart | |
| 4,386,649 A * | 6/1983 | Hines et al. ................. | 165/239 |
| 4,388,692 A | 6/1983 | Jones et al. | |
| 4,431,134 A | 2/1984 | Hendricks et al. | |
| 4,442,972 A | 4/1984 | Sahay et al. | |

(Continued)

FOREIGN PATENT DOCUMENTS

DE 33341176 4/1985

(Continued)

OTHER PUBLICATIONS

Blister Pack Insert from a Ritetemp 8082 Touch Screen Thermostat Product, 2 pages, 2002.

(Continued)

*Primary Examiner*—Melvin Jones
(74) *Attorney, Agent, or Firm*—Crompton, Seager & Tufte, LLC

(57) ABSTRACT

A thermostat system having multiple and individual schedules. For instance, a user may have different schedules and setpoints for heating and cooling. An appropriate schedule combining individual schedules may be automatically selected based on a system configuration. Schedule control may involve manual changeover from one schedule to another or automatic changeover relative to the schedule combining schedules. The thermostat system may be programmable. Also, there may be a system switch mode, for example, between heat and cool, where the schedules of either may be edited. Scheduling may be menu and option key driven.

11 Claims, 20 Drawing Sheets

U.S. PATENT DOCUMENTS

| | | |
|---|---|---|
| 4,446,913 A | 5/1984 | Krocker |
| 4,479,604 A | 10/1984 | Didner |
| 4,506,827 A | 3/1985 | Jamieson et al. |
| 4,556,169 A | 12/1985 | Zervos |
| 4,606,401 A | 8/1986 | Levine et al. |
| 4,621,336 A | 11/1986 | Brown |
| 4,622,544 A | 11/1986 | Bially et al. |
| 4,628,201 A | 12/1986 | Schmitt |
| 4,646,964 A | 3/1987 | Parker et al. |
| 4,717,333 A | 1/1988 | Carignan |
| 4,725,001 A | 2/1988 | Carney et al. |
| 4,837,731 A | 6/1989 | Levine et al. |
| 4,881,686 A | 11/1989 | Mehta |
| 4,918,439 A | 4/1990 | Wozniak et al. |
| 4,948,040 A | 8/1990 | Kobayashi et al. |
| 4,992,779 A | 2/1991 | Sugino et al. |
| 4,997,029 A | 3/1991 | Otsuka et al. |
| 5,005,365 A | 4/1991 | Lynch |
| 5,012,973 A | 5/1991 | Dick et al. |
| 5,038,851 A | 8/1991 | Mehta |
| 5,053,752 A | 10/1991 | Epstein et al. |
| 5,065,813 A | 11/1991 | Berkeley et al. |
| 5,086,385 A | 2/1992 | Launey et al. |
| 5,088,645 A | 2/1992 | Bell |
| 5,140,310 A | 8/1992 | DeLuca et al. |
| 5,161,606 A | 11/1992 | Berkeley et al. |
| 5,170,935 A | 12/1992 | Federspiel et al. |
| 5,172,565 A | 12/1992 | Wruck et al. |
| 5,181,653 A | 1/1993 | Foster et al. |
| 5,230,482 A | 7/1993 | Ratz et al. |
| 5,238,184 A | 8/1993 | Adams |
| 5,251,813 A | 10/1993 | Kniepkamp |
| 5,259,445 A | 11/1993 | Pratt et al. |
| 5,329,991 A | 7/1994 | Mehta et al. |
| 5,348,078 A | 9/1994 | Dushane et al. |
| 5,386,577 A | 1/1995 | Zenda |
| 5,404,934 A | 4/1995 | Carlson et al. |
| 5,482,209 A | 1/1996 | Cochran et al. |
| 5,526,422 A | 6/1996 | Keen |
| 5,537,106 A | 7/1996 | Mitcuhashi |
| 5,566,879 A | 10/1996 | Longtin |
| 5,570,837 A | 11/1996 | Brown et al. |
| 5,673,850 A | 10/1997 | Uptegraph |
| 5,682,206 A | 10/1997 | Wehmeyer et al. |
| 5,732,691 A | 3/1998 | Maiello et al. |
| 5,782,296 A | 7/1998 | Metha |
| 5,818,428 A | 10/1998 | Eisenbrandt et al. |
| 5,873,519 A | 2/1999 | Beilfuss |
| 5,886,697 A | 3/1999 | Naughton et al. |
| 5,902,183 A | 5/1999 | D'Souza |
| 5,915,473 A | 6/1999 | Ganesh et al. |
| 5,937,942 A | 8/1999 | Bias et al. |
| 5,947,372 A | 9/1999 | Tiernan |
| 5,950,709 A | 9/1999 | Krueger et al. |
| 6,020,881 A | 2/2000 | Naughton et al. |
| 6,032,867 A | 3/2000 | Dushane et al. |
| 6,059,195 A | 5/2000 | Adams et al. |
| 6,081,197 A | 6/2000 | Garrick et al. |
| 6,101,824 A | 8/2000 | Meyer et al. |
| 6,104,963 A | 8/2000 | Cebasek et al. |
| 6,119,125 A | 9/2000 | Gloudeman et al. |
| 6,121,875 A | 9/2000 | Hamm et al. |
| 6,140,987 A | 10/2000 | Stein et al. |
| 6,141,595 A | 10/2000 | Gloudeman et al. |
| 6,149,065 A | 11/2000 | White et al. |
| 6,154,681 A | 11/2000 | Drees et al. |
| 6,167,316 A | 12/2000 | Gloudeman et al. |
| 6,192,282 B1 | 2/2001 | Smith et al. |
| 6,196,467 B1 | 3/2001 | Dushane et al. |
| 6,208,331 B1 | 3/2001 | Singh et al. |
| 6,216,956 B1 | 4/2001 | Ehlers et al. |
| 6,236,326 B1 | 5/2001 | Murphy |
| 6,285,912 B1 | 9/2001 | Ellison et al. |
| 6,290,140 B1 | 9/2001 | Pesko et al. |
| 6,315,211 B1 | 11/2001 | Sartain et al. |
| 6,318,639 B1 | 11/2001 | Toth |
| 6,330,806 B1 | 12/2001 | Beaverson et al. |
| 6,344,861 B1 | 2/2002 | Naughton et al. |
| 6,351,693 B1 | 2/2002 | Monie et al. |
| 6,398,118 B1 | 6/2002 | Rosen et al. |
| 6,453,687 B2 | 9/2002 | Sharood et al. |
| 6,466,132 B1 | 10/2002 | Caronna et al. |
| 6,478,233 B1 | 11/2002 | Shah |
| 6,502,758 B2 | 1/2003 | Cottrell |
| 6,518,953 B1 | 2/2003 | Armstrong |
| 6,518,957 B1 | 2/2003 | Lehtinen et al. |
| 6,546,419 B1 | 4/2003 | Humpleman et al. |
| 6,556,899 B1 | 4/2003 | Harvey et al. |
| 6,578,770 B1 | 6/2003 | Rosen |
| 6,580,950 B1 | 6/2003 | Johnson et al. |
| 6,581,846 B1 | 6/2003 | Rosen |
| 6,595,430 B1 | 7/2003 | Shah |
| 6,608,560 B2 | 8/2003 | Abrams |
| 6,619,555 B2 | 9/2003 | Rosen |
| 6,621,507 B1 | 9/2003 | Shah |
| 6,726,112 B1 | 4/2004 | Ho |
| 6,786,421 B2 | 9/2004 | Rosen |
| 6,789,739 B2 | 9/2004 | Rosen |
| 6,868,293 B1 | 3/2005 | Schurr et al. |
| 2001/0029585 A1 | 10/2001 | Simon et al. |
| 2001/0042684 A1 | 11/2001 | Essalik et al. |
| 2001/0052459 A1 | 12/2001 | Essalik et al. |
| 2002/0005435 A1 | 1/2002 | Cottrell |
| 2002/0011923 A1 | 1/2002 | Cunningham et al. |
| 2002/0022991 A1 | 2/2002 | Sharood et al. |
| 2002/0060701 A1 | 5/2002 | Naughton et al. |
| 2002/0092779 A1 | 7/2002 | Essalik et al. |
| 2002/0096572 A1 | 7/2002 | Chene et al. |
| 2002/0138184 A1 | 9/2002 | Kipersztok et al. |
| 2002/0173929 A1 | 11/2002 | Seigel |
| 2003/0000692 A1 | 1/2003 | Okano et al. |
| 2003/0014179 A1 | 1/2003 | Szukala et al. |
| 2003/0033156 A1 | 2/2003 | McCall |
| 2003/0033230 A1 | 2/2003 | McCall |
| 2003/0034897 A1 | 2/2003 | Shamoon et al. |
| 2003/0034898 A1 | 2/2003 | Shamoon et al. |
| 2003/0074489 A1 | 4/2003 | Steger et al. |
| 2003/0121652 A1 | 7/2003 | Carey et al. |
| 2003/0123224 A1 | 7/2003 | LaCroix et al. |
| 2003/0136135 A1 | 7/2003 | Kim et al. |
| 2003/0142121 A1 | 7/2003 | Rosen |
| 2003/0150926 A1 | 8/2003 | Rosen |
| 2003/0150927 A1 | 8/2003 | Rosen |
| 2004/0074978 A1 | 4/2004 | Rosen |
| 2004/0245352 A1 | 12/2004 | Smith |
| 2004/0262410 A1 | 12/2004 | Hull |

FOREIGN PATENT DOCUMENTS

| | | |
|---|---|---|
| EP | 0070414 | 1/1983 |
| EP | 0678204 | 3/2000 |
| EP | 0985994 | 3/2000 |
| EP | 1033641 | 9/2000 |
| EP | 1074009 | 2/2001 |
| FR | 2711230 | 4/1995 |
| WO | WO 97/11448 | 3/1997 |
| WO | WO 97/39392 | 10/1997 |
| WO | WO 00/43870 | 7/2000 |
| WO | WO 01/52515 | 7/2001 |
| WO | WO 01/79952 | 10/2001 |

OTHER PUBLICATIONS

Operation Manual for Ritetemp Touch Screen Thermostat 8082, 8 pages, 2002.

Trouble Shooting Guide for Ritetemp Thermostat 8082, 1 page, 2002.
Quick Start Guide for Ritetemp Thermostat 8082, 1 page, 2002.
Install Guide for Ritetemp Thermostat 8082, 6 pages, 2002.
Remote Control Power Requirement for Ritetemp Thermostat 8082, 1 page, 2002.
Mounting Template for Ritetemp Thermostat 8082, 1 page, 2002.
"A Full Range of Alternative User Interfaces For Building Occupants and Operators," http://www.automatedbuildings.com/news/jan00/articles/andover/andover.htm, 5 pages, dated Jan. 2000, printed Sep. 20, 2004.
"CorAccess Systems/In Home," http://web.archive.org/web20011212084427/www.coraccess.com/home.html, 1 page, copyright 2001, printed Aug. 19, 2004.
"HAI Company Background," http://www.homeauto.com/AboutHAI/abouthai_main.htm, 2 pages, printed Aug. 19, 2004.
"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.
"Home Toys Review—TouchLinc", http://www.hometoys.com/htinews/aug99/reviews/touchlinc/touchlinc.htm, 3 pages, dated Aug. 1999, printed Aug. 20, 2004.
"HTI News Release," http://www.hometoys.com/htinews/apr99/releases/ha101.htm, 3 pages, printed Oct. 28, 2004.
"Mark of Excellence Award Finalist Announced," http://64.233.167.104/search?Q=cache:ciOA2YtYaBIJ:www.hometoys.com/releases/mar . . . , 6 pages, Leopard Touchscreen on p. 2, dated prior to Mar. 4, 2000, printed Aug. 20, 2004.
"Product Review—Philips Pronto Remote Control," http://hometheaterhifi.com/volume_6_2/philipsprontoremotecontrol.html, 5 pages, dated May 1999, printed Aug. 20, 2004.
"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.
"Spotlight on integrated systems," Custom Builder, V8, N2, p. 66(6), Mar.-Apr. 1993.
"Vantage Expands Controls for Audio/Video, HVAC and Security," http://www.hometoys.com/htinews/aug99/releases/vantage03.htm, 2 pages, dated Aug. 3, 1999, printed Aug. 20, 2004.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 5 pages, May 2001; First Sale Feb. 2001.
Aprilaire Electronic Thermostats Models 8344, 8346, 8348, 8363, 8365, 8366 Operating Instructions, 8 pages, prior to filed of present application.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
AutomatedBuildings.com Article—"Thin Client" Solutions, "Pressure, Air Flow, Temperature, Humidity & Valves," Dwyer Instruments, Inc., 5 pages, printed Sep. 20, 2004.
Blake et al., "Seng 310 Final Project Demo Program" Illustration, 3 pages, Apr. 6, 2001.
Blake et al., "Seng 310 Final Project" Report, dated Apr. 6, 2001.
Braeburn Model 3000 Owner's Manual, pp. 1-13, 2001.
Braeburn Model 5000 Owners Manual, pp. 1-17, 2001.
BRK Electronics Maximum Protection Plus Ultimate Convenience Smoke Alarm, 24 pages, prior to filing date of present application.
BRK First Alert, User's Manual, Smoke and Fire Alarms, pp. 1-7, Nov. 2002.
Business Wire, "MicroTouch Specialty Products Group to Capitalize on Growing Market for Low-Cost Digital Matrix Touchscreens," p. 1174 (2 pages), Jan. 6, 1999.
Cardio Manual, available at http://www.secant.ca/En/Documentation/Cardio2é-Manual.pdf, Cardio Home Automation Inc., 55 pages, printed Sep. 28, 2004.
Cardio, by Secant; http://www.hometoys.com/htinews/apr98/reviews/cardio.htm, "HTINews Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to filing date of present application.
Carrier, "Programmable Dual Fuel Thermostat," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8 pages, 1998.
Carrier, "Thermidistat Control," Installation, Start-Up, and Operating Instructions, pp. 1-12, Aug. 1999.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
CorAccess, "Companion 6," User Guide, pp. 1-20, Jun. 17, 2002.
Danfoss RT51/51RF & RT52/52RF User Instructions, 2 pages, Jun. 2004.
DeKoven et al., "Designing Collaboration in Consumer Products," 2 pages, 2001.
Domotique Secant Home Automation—Web Page, available at http://www.secant.ca/En/Company/Default.asp, 1 page, printed Sep. 28, 2004.
Firex Smoke Alarm, Ionization Models AD, ADC Photoelectric Model Pad, 4 pages, prior to filing date of present application.
Freudenthal et al., "Communicating extensive smart home functionality to users of all ages: the design of a mixed-initiative multimodal thermostat-interface," pp. 34-39, Mar. 12-13, 2001.
Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell News Release, "Honeywell's New Sysnet Facilities Integration System for Boiler Plant and Combustion Safety Processes," 4 pages, Dec. 15, 1995.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://www.cc.gatech.edu/computing/classes/cs6751_94_fall/groupc/climate-2/node1.html, "Contents," 53 pages, printed Sep. 20, 2004.
http://www.ritetemp.info/rtMenu_13.html, Rite Temp 8082, 8 pages, printed Jun. 20, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.

http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.
Hunter, "44200/44250," Owner's Manual, 32 pages, printed prior to filing date.
Hunter, "44300/44350," Owner's Manual, 35 pages, printed prior to filing date.
Hunter, "Auto Saver 550", Owner's Manual Model 44550, 44 pages, printed prior to filing date.
Invensys User's Manual, 21 pages, prior to filing date of present application.
Invensys™, "9700i 9701i 9715i 9720i Deluxe Programmable Thermostats," User's Manual, pp. 1-28, printed prior to filing date.
Lux ELV1 Programmable Line Voltage Thermostat, Installation Instructions, 3 pages, prior to filing date of present application.
Lux TX500 Series Smart Temp Electronic Thermostat, 3 pages, prior to filing date of present application.
Lux TX9000 Installation, 3 pages, prior to filing date of present application.
Lux, "511 Series Smart Temp Electronic Thermostat," Owner's Manual, 3 pages, printed prior to filing date.
Lux, "600 Series Smart Temp Electronic Thermostat," Owner's Manual, 3 pages, printed prior to filing date.
Lux, "602 Series Multi-Stage Programmable Thermostat," Owner's Manual, 2 pages, printed prior to filing date.
Lux, "605/2110 Series Programmable Heat Pump Thermostat," Owner's Manual, 3 pages, printed prior to filing date.
Lux, "700/9000 Series Smart Temp Electronic Thermostat," Owner's Manual, 3 pages, printed prior to filing date.
Lux, "PSPH521 Series Programmable Heat Pump Thermostat," Owner's Manual, 3 pages, printed prior to filing date.
Lux, "TX1500 Series Smart Temp Electronic Thermostat," Owner's Manual, 6 pages, printed prior to filing date.
METASYS, "HVAC PRO for Windows User's Manual," 308 pages, 1998.
Prolifix, Inc., "Web Enabled IP Thermostats," Ultimate in Energy Efficiency!, 2 pages, prior to filing date of current application.
Ritetemp Operation 8029, 3 pages, Jun. 19, 2002.
Ritetemp Operation 8050, 5 pages, Jun. 26, 2002.
Ritetemp Operation 8085, pp. 1-6, prior to filing date of present application.
Sealed Unit Parts Co., Inc., Supco & CTC Thermostats . . . loaded with features, designed for value!, 6 pages, prior to filing date of present application.
Totaline Model P474-1035 Owner's Manual Programmable 5-2 Day Digital Thermostat, pp. 1-21, prior to filing date of present application.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to filing date of present application.
Totaline, "1 for All programmable Digital Thermostat," Owner's Manual P/N P374-1100FM, 23 pages, Nov. 1998.
Totaline, "1 for All Programmable Digital Thermostat," Owner's Manual P/N P474-1050, 21 pages, Nov. 1998.
Totaline, "1 for All Programmable Digital Thermostat," Owner's Manual P/N P374-1100, 24 pages, Apr. 2001.
Totaline, "Intellistat Combination Temperature and Humidity Control," Owner's Manual P/N P374-1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Visor Handheld User Guide, Copyright 1999-2000.
WarmlyYours, "Model TH111GFCI-P (120 VAC)," Manual, pp. 1-4, printed prior to filing date.
White-Rodgers 1F80-224 Programmable Electronic Digital Thermostat, Installation and Operation Instructions, 8 pages, prior to filing date of present application.
White-Rodgers Comfort-Set III Thermostat, pp. 1-44, prior to filing date of present application.
White-Rodgers Installation Instructions for Heating & Air Conditioning IF78 Non-Programmable Thermostat, 6 pages, prior to filing date of present application.
White-Rodgers Installation Instructions for Heating & Air Conditioning IF78 5/2 Day Programmable Thermostat, 7 pages, prior to filing date of present application.
White-Rodgers, "Installation Instructions for Heating & Air Conditioning IF72 5/2 Day Programmable Heat Pump Thermostat," 8 pages, printed prior to filing date.
White-Rodgers, "Comfort-Set 90 Series Thermostat," Manual, pp. 1-24, printed prior to filing date.
White-Rodgers, 1F80-240 "(for Heating Only systems) Programmable Electronic Digital Thermostat," Installation and Operation Instructions, 8 pages, printed prior to filing date.
White-Rodgers, 1F80-241 "Programmable Electronic Digital Thermostat," Installation and Operation Instructions, 6 pages, printed prior to filing date.
White-Rodgers, 1F80-261 "Programmable Electronic Digital Thermostat," Installation and Operation Instructions, 8 pages, printed prior to filing date.
White-Rodgers, 1F81-261 "Programmable Electronic Digital Multi-Stage Thermostat," Installation and Operation Instructions, 8 pages, printed prior to filing date.
White-Rodgers, 1F82-261 "Programmable Electronic Digital Heat Pump Thermostat," Installation and Operation Instructions, 8 pages, printed prior to filing date.
White-Rodgers, Comfort-Set 90 Series Premium, 4 pages, prior to filing date of present application.
www.icmcontrols.com, Simplecomfort, SC3000 Single Stage Heat/Single Stage Cool or Single Stage Heat Pump/Manual Changeover, 1 page, printed prior to filing date.
www.icmcontrols.com, Simplecomfort, SC3001 Single Stage Heat/Single Stage Cool or Single Stage Heat Pump/Manual Changeover, 1 page, printed prior to filing date.
www.icmcontrols.com, Simplecomfort, SC3006 Single Stage Heat/Single Stage Cool or Single Stage Heat Pump/Manual Changeover, 1 page, printed prior to filing date.
www.icmcontrols.com, Simplecomfort, SC3201 2 Stage Heat Pump Manual Changeover, 1 page, printed prior to filing date.
www.icmcontrols.com, Simplecomfort, SC3801 2 Stage Heat/2 Stage Cool 2 Stage Heat Pump/Audio Changeover, 1 page, printed prior to filing date.
Certified U.S. Appl. No. 10/440,474, filed May 15, 2003.
Certified U.S. Appl. No. 10/654,230, filed Sep. 3, 2003.
Certified U.S. Appl. No. 10/654,235, filed Sep. 3, 2003.

* cited by examiner

AUTOMATIC THERMOSTAT SCHEDULE/PROGRAM SELECTOR SYSTEM

BACKGROUND

The present invention pertains to thermostats and particularly to programmable thermostats.

SUMMARY

The invention is a thermostat system that may have multiple schedules with each schedule having its own setpoints and times. The system may operate with one schedule at a time. There may be an option for combining the multiple schedules.

DESCRIPTION

The present invention may be regarded as an automatic thermostat schedule/program selector. The selector may be at least a portion of thermostat control system used for controlling heating, ventilating and air conditioning (HVAC) equipment. Since some may regard the terms "schedule" and "program" as somewhat synonymous and interchangeable, the term "schedule" may be used in the present description. The thermostat described here is an illustrative example of the invention. The thermostat may provide a user with different schedules for heat and cool modes. An appropriate schedule may be automatically selected based on a system configuration (i.e., a manual changeover (MCO) or an automatic changeover (ACO)) and a system switch mode (i.e., heat or cool).

A default configuration may include the MCO and the heat mode. With this configuration, two or more schedules may be utilized. The latter may be seen by going into a "Set Schedule" menu and sequencing through the schedule. In this mode, the heat times and setpoints may be adjusted and/or viewed. To adjust and/or view the cool schedule, the user should first set the system to "Cool" (or "Off"), and then enter the "Set Schedule" menu. The schedule sequence may allow the user to adjust and/or view the cooling times and setpoints.

Figure 1:
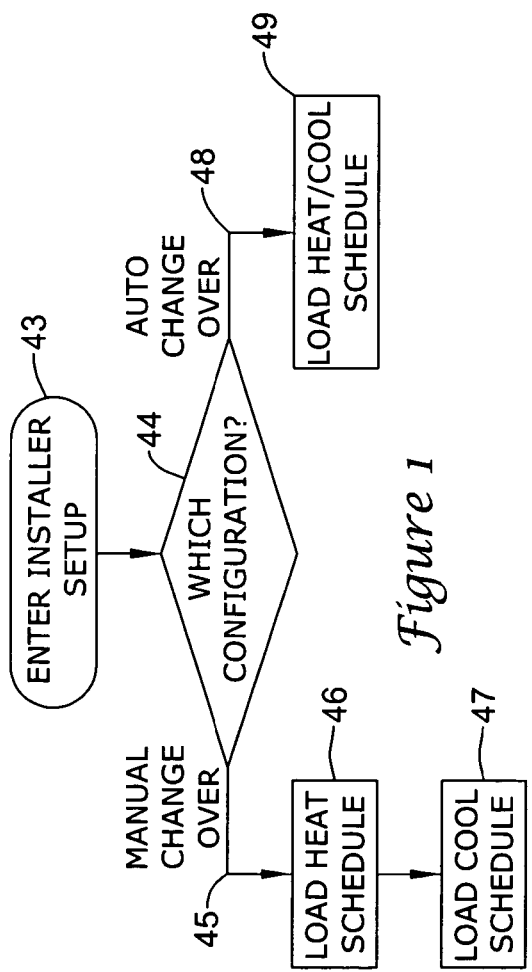
FIG. 1 shows a flow diagram of the changeover and auto changeover selection.
Figure 2:
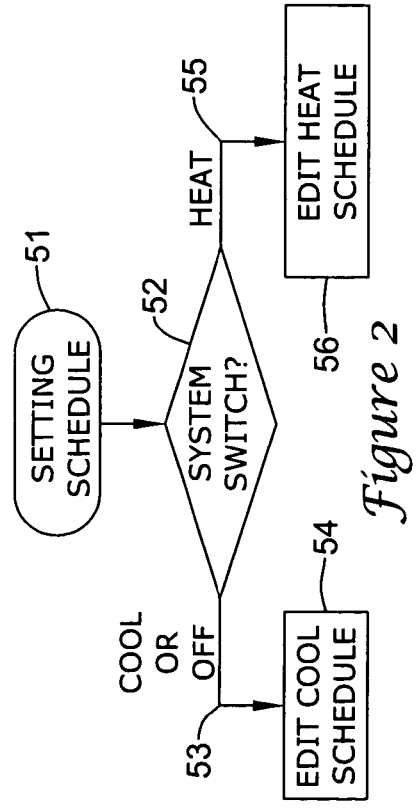
FIG. 2 shows a flow diagram of a setting schedule.

FIG. 1 shows a flow diagram of the two schedule manual changeover and auto changeover selection. First, an installer setup 43 may be entered, upon which a configuration decision 44 is to be made. The manual changeover 45 may be selected and lead to a load 46 heat schedule and load 47 cool schedule. Or, the auto changeover 48 may be selected and lead to a load 46 heat/cool schedule. FIG. 2 shows a flow diagram of the setting schedule 51 which may lead to a system switch decision. Selecting a "cool or off" 53 may lead to an edit 54 cool schedule. Selecting a "heat" 55 may lead to an edit 56 heat schedule.

Figure 3:
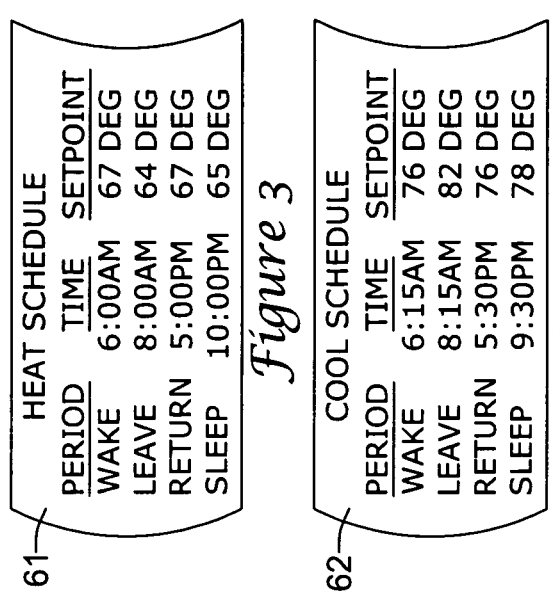
FIGS. 3-5 show example schedules.
Figure 4:
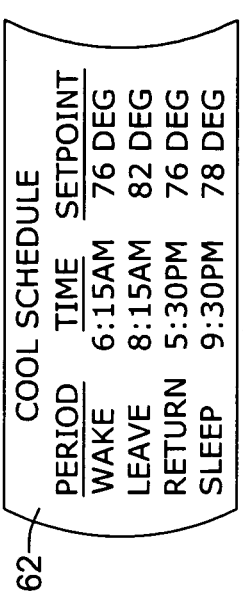
Figure 5:
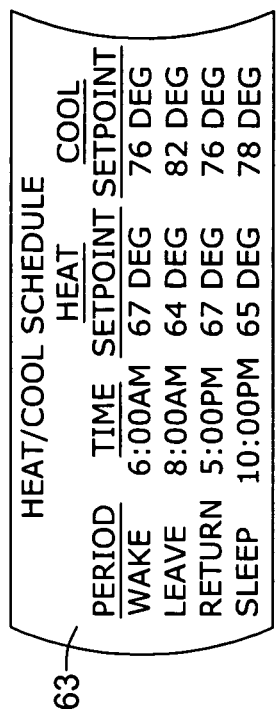

FIGS. 3, 4 and 5 reveal illustrative instances of a heat schedule 61, a cool schedule 62, and a heat/cool schedule 63. There may be additional schedules. Each schedule may have its own multiplicity of periods. For an illustrative instance, the heat schedule 61 in FIG. 3 shows periods Wake, Leave, Return and Sleep, with their start times and heat temperature set points. Another schedule 62 in FIG. 4 shows those four periods with their start times and cool temperature set points. The start times for the cool schedule 62 may be different than those for the heat schedule 61. Schedules 61 and 62 are for the manual changeover 45. As shown in FIG. 5, the schedules 61 and 62 may be combined into schedule 63 for the auto changeover 48. When schedules 61 and 62 are combined into the schedule 63, the start times of the heat schedule 61 for the four listed periods may prevail over the start times of schedule 62. The heat/cool schedule 63 may be used when the system 10 is configured for auto changeover. The heat schedule 61 may be used when system 10 is configured for manual changeover, or for heat only. The cool schedule 62 may be used when the system 10 is configured for manual changeover, or for cool only.

Figure 6:
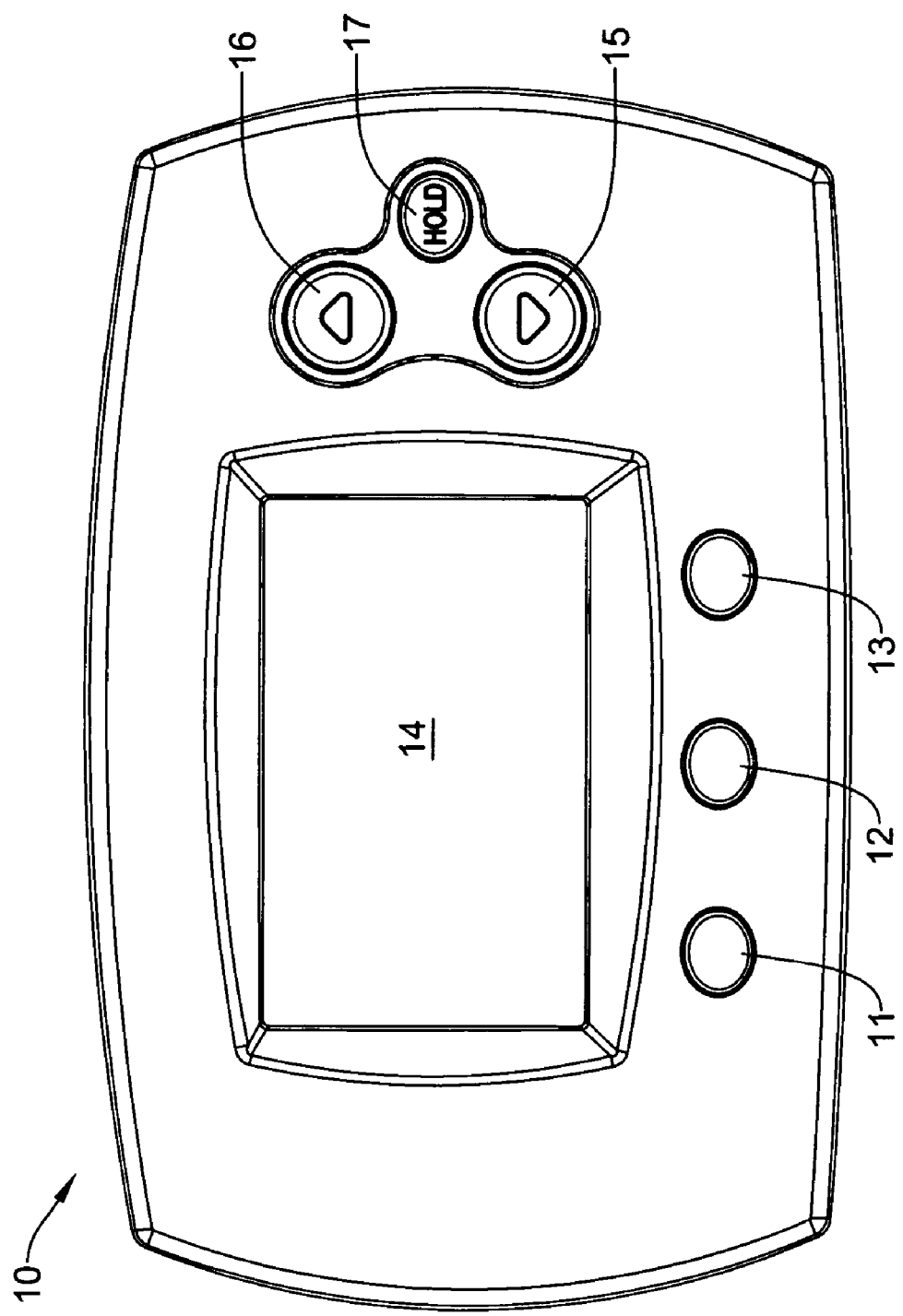
FIG. 6 shows an example of the present thermostat.
Figure 7:
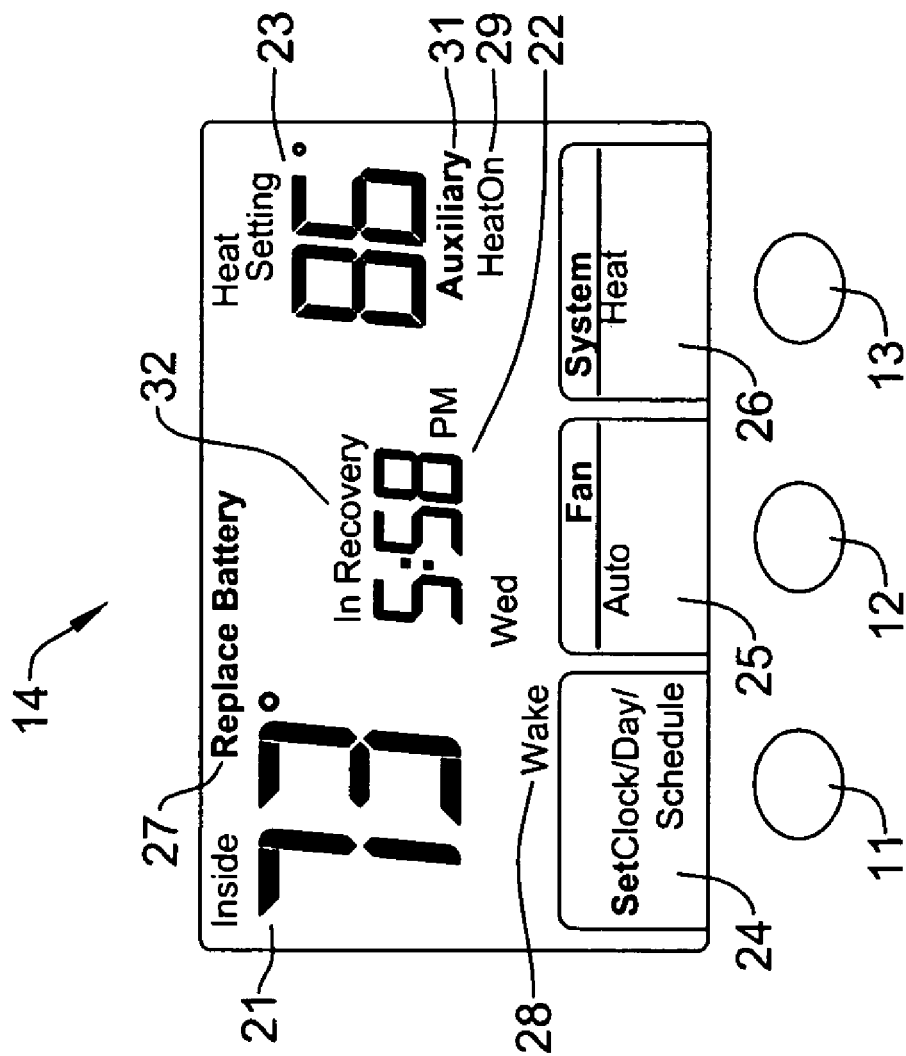
FIG. 7 reveals a screen of the thermostat.

FIGS. 6 and 7 show a thermostat 10 and its screen 14 which may utilize the present invention. Thermostat 10 may have separately programmable weekday/weekend schedules, one-touch temperature control to override a program schedule at any time, and an easy to read display at day or night time, which displays both ambient temperature and a temperature setting. These items and other items may be programmed in thermostat 10 with the thermostat disconnected from a heating and/or cooling system that the thermostat may be intended to control. Disconnecting the thermostat 10 from the heating and cooling system may involve merely unplugging the thermostat from, for example, a wall socket which is connected to the system. In other words, a user may program, modify or adjust items of the thermostat 10 while sitting in an armchair.

Thermostat 10 may have a screen 14 using LCD or other display technology, as in FIG. 7. There may be three function buttons or softkeys 11, 12 and 13, which may be pressed to select a function labeled (e.g., menu or area) in the display 14 just above each button, respectively. The functions shown above each button may change depending on the task. An up (increase) button 16 and a down (decrease) button 15 (sometimes with appropriate arrow indications on the buttons) may be situated near the of display screen 14 on a face of the thermostat 10. These buttons 15 and 16 may be used to adjust time and temperature setpoints. Proximate to buttons 15 and 16 may be a hold button 17 for overriding programmed temperature control.

FIG. 7 shows various components of the display screen 14. Item 21 indicates the present inside temperature, item 22 shows the current time and day, item 23 shows a temperature setting or setpoint, and item 24 shows a function selection proximate to button 11. Item 25 shows the fan settings proximate to button 12, and item 26 shows a system setting function selection area proximate to button 13. Also, on display 14 is a low battery warning ("Replace Battery") indicator 27, a current program period indicator 28, a system status indicator 29, an auxiliary heat indicator 31, and an "In Recovery" indicator 32.

Figure 8:
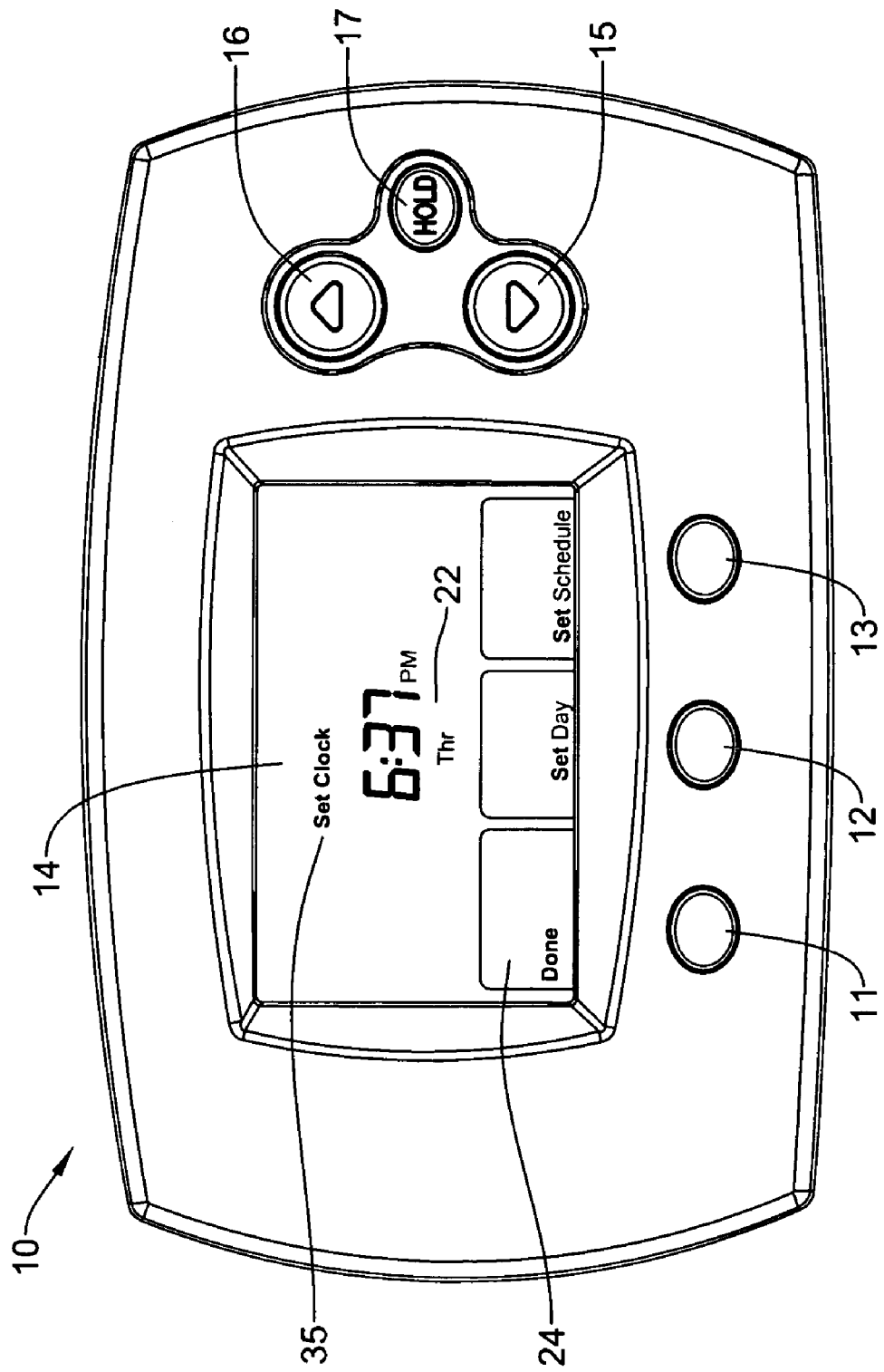
FIG. 8 shows a set clock mode.
Figure 9:
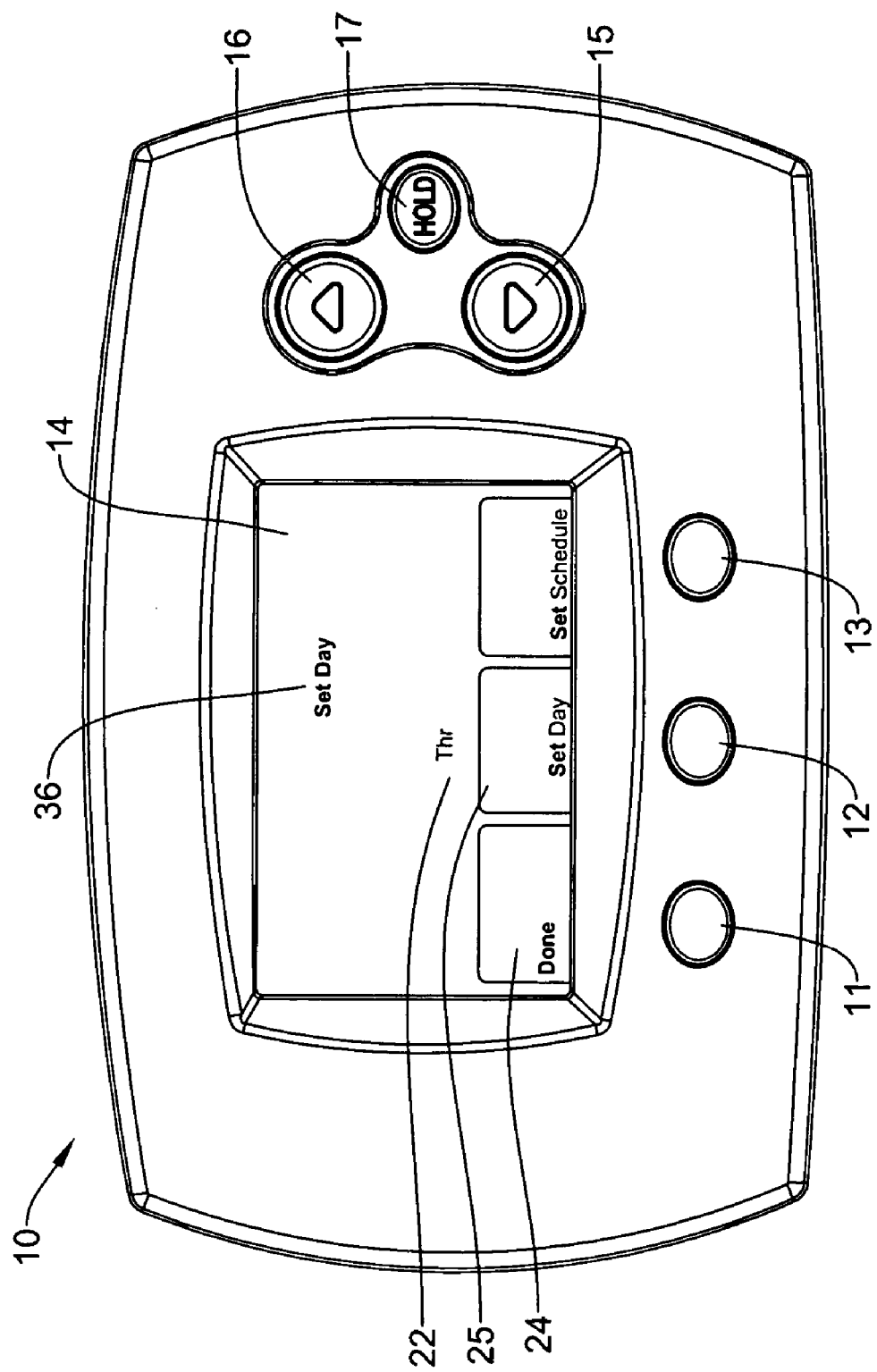
FIG. 9 shows a set day mode.

To set the time and day for thermostat 10, the button 11 situated below area 21 which says "Set Clock/Day/Schedule" may be pressed. Then a "Set Clock" logo 35 may flash on and off near the center of screen 14 and next to the time and day display 22, as shown in FIG. 8. One may press button 15 or 16 to set the clock time. After the clock is set or is determined to already show the time as desired, then the button 12 under area 25 that says "Set Day", may be pressed which will result in a "Set Day" logo 36 that flashes on and off, as shown in FIG. 9. The button 15 or 16 may be pressed for selecting the day of the week. Then one may press button 11 under area 24, which says "Done", to save and exit the time and day option. There may additionally be a date indicator (not shown) which could be set.

Figure 11:
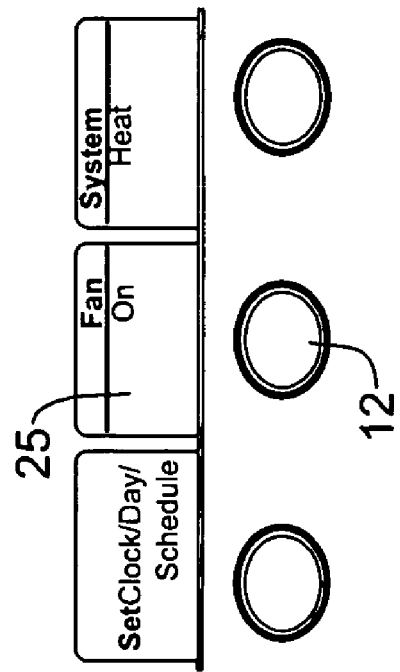
FIGS. 10 and 11 show fan mode selections.
Figure 10:
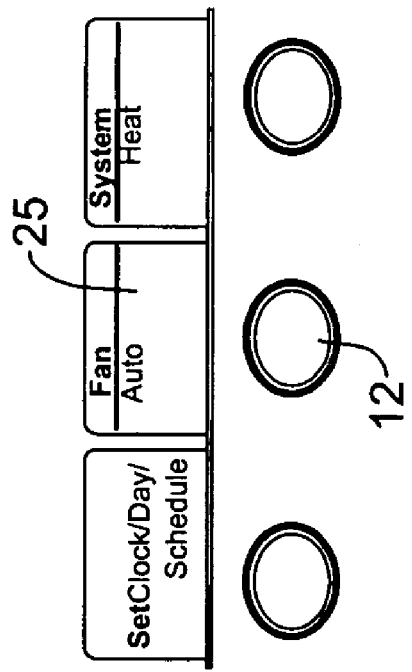

The fan setting may be selected. Button 12 under the "Fan" setting area 25 may be pressed to select "Auto" or "On" for fan operation, as shown in FIGS. 10 and 11. In the "Auto" mode, the fan may run only when the heating or cooling system is on. If set to "On", the fan may run continuously. The "On" setting may be used for improved air circulation, or for more efficient air cleaning. Area 25 in some versions of thermostat 10 may also have various fan or air mover speed settings.

Figure 12:
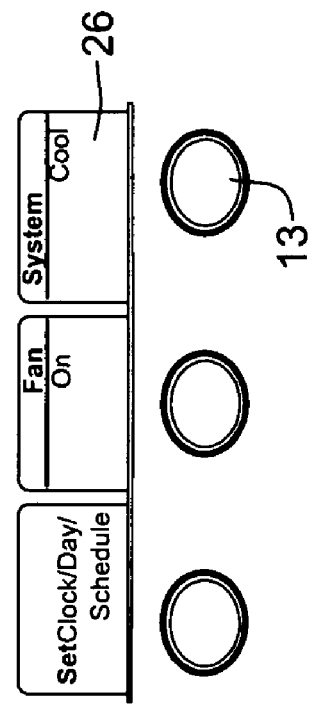
FIGS. 12-16 show various system selections.
Figure 13:
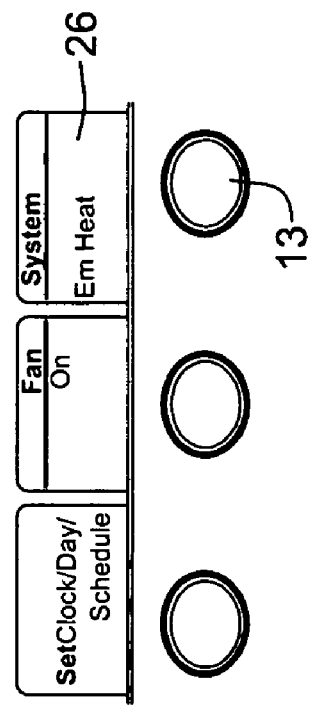
Figure 14:
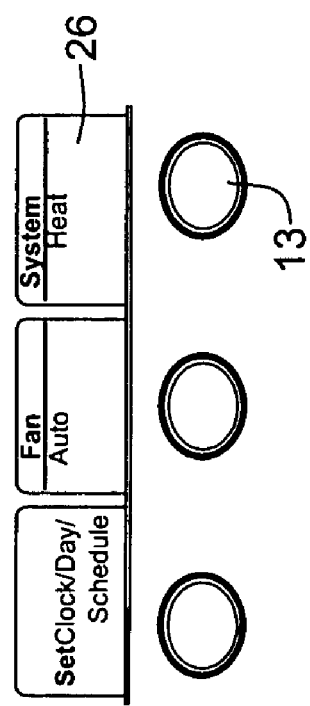
Figure 15:
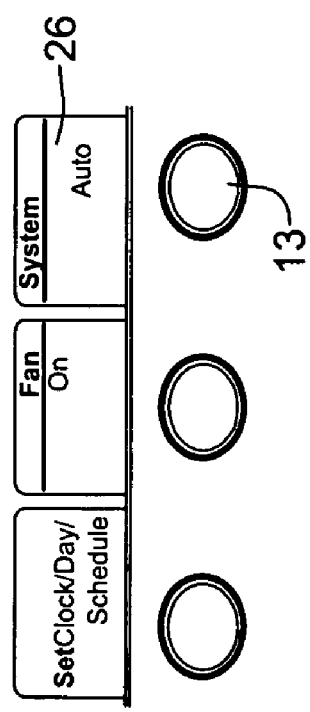
Figure 16:
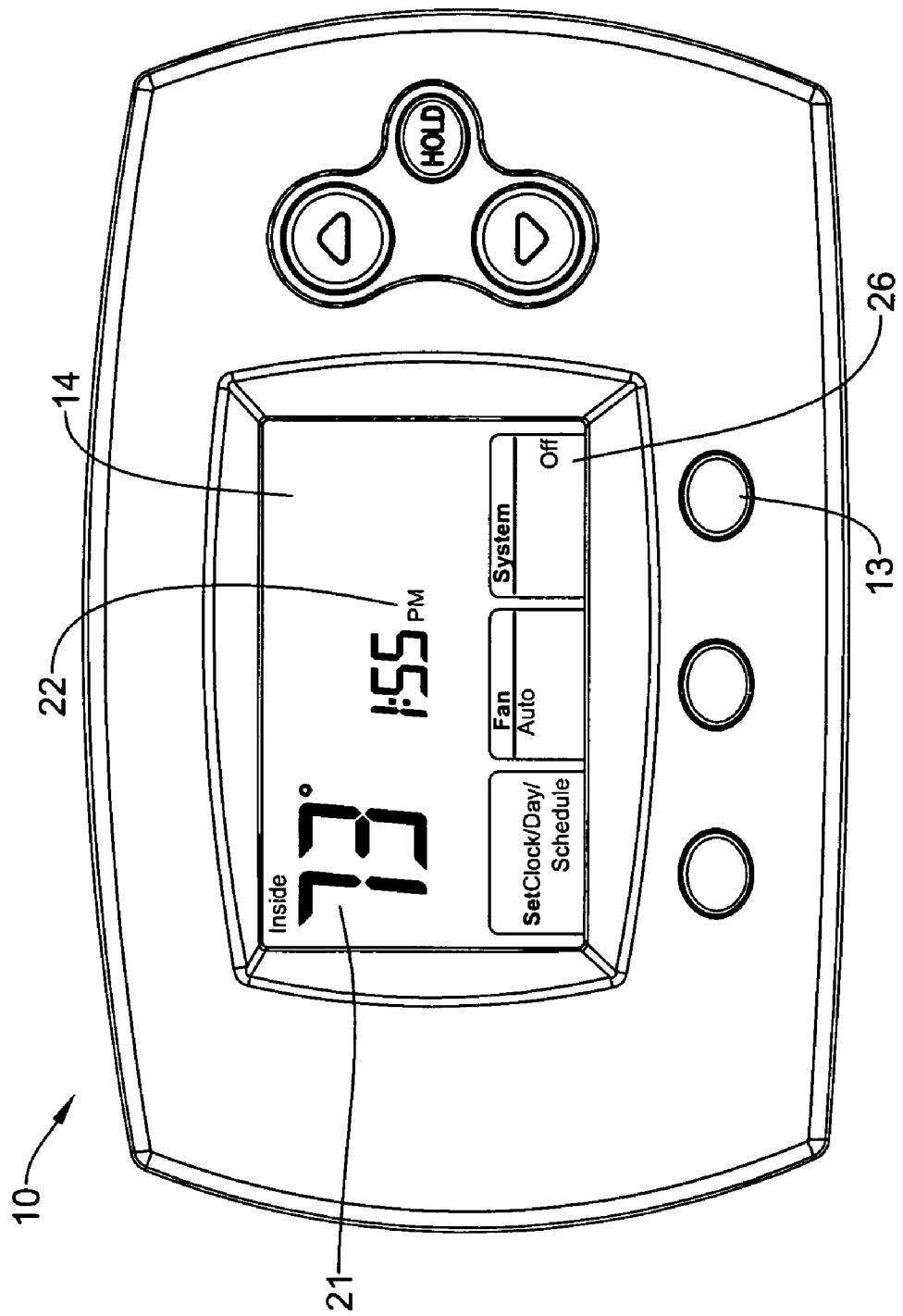

A system setting may be selected menu 26. The button 13 may be pressed to select "Heat" and get the heating system, as shown in FIG. 12. With this selection, the thermostat 10 may control just the heating system. Button 13 may be pressed to select "Cool" and get the heating system, as shown in FIG. 13. With this selection, the thermostat 10 may control just the cooling system. Button 13 may be pressed to select "Off." Here, both heating and cooling systems may be off. In some cases, one may get selections "Auto" or "Em Heat", as shown in FIGS. 14 and 15, respectively. These system settings might not appear on the thermostat 10 as their appearance could depend on how the thermostat is installed. With the selection "Auto", the thermostat may automatically select the heating or cooling system depending on the indoor temperature 21 and the single schedule setpoint setting. The "Em Heat" selection may be for only heat pumps with auxiliary heat. Here, the thermostat 10 may control emergency and auxiliary heat, and lock out the compressor. There may be additional system settings or selections in menu 26. FIG. 16 of thermostat 10 shows "Off" selected in system menu 26. Here, screen 14 might reveal only the inside temperature 21, the time 22, and the three menus at the bottom of the screen.

Figure 17:
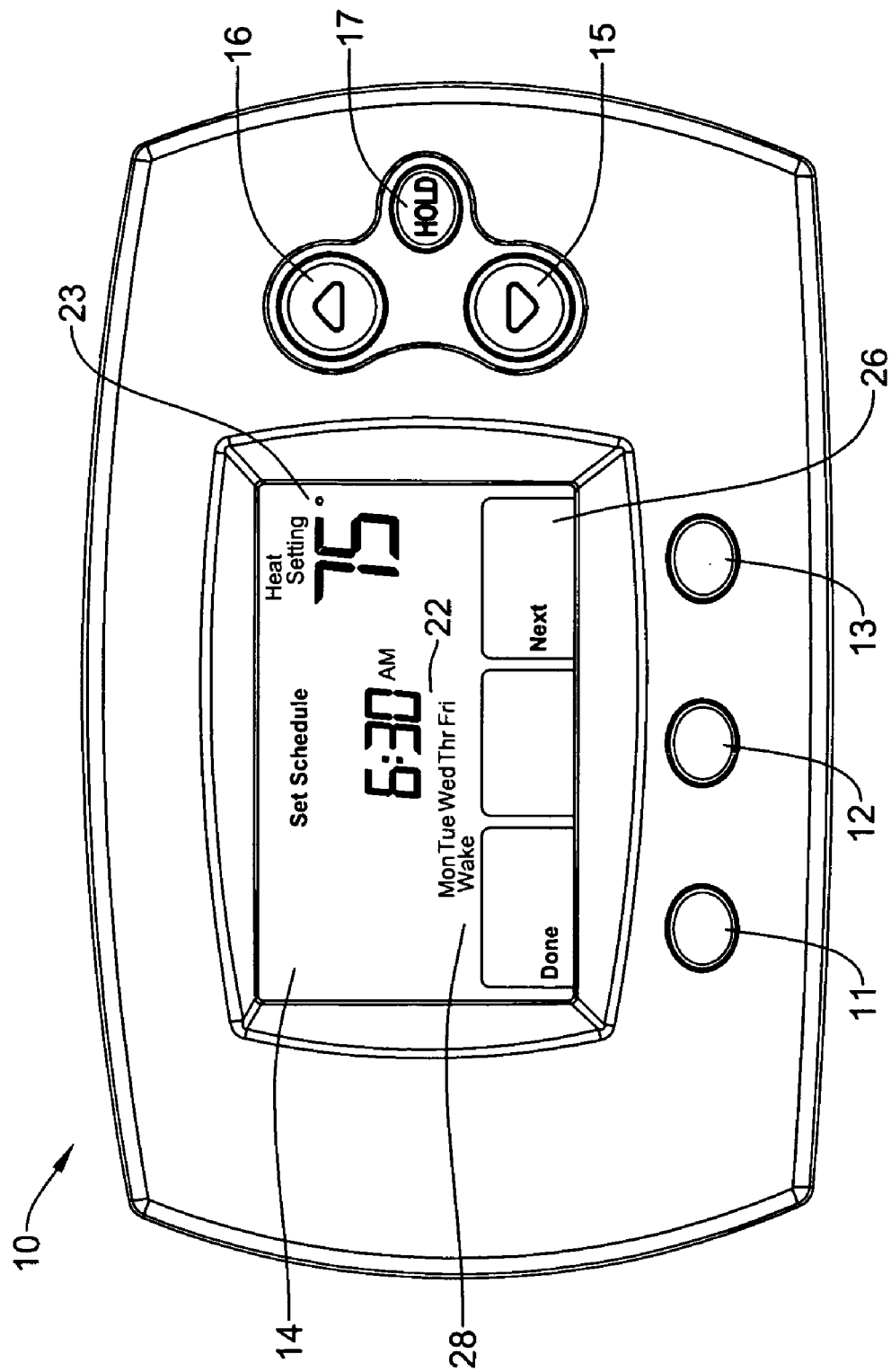
FIGS. 17-20 show settings for several periods of a weekday.
Figure 18:
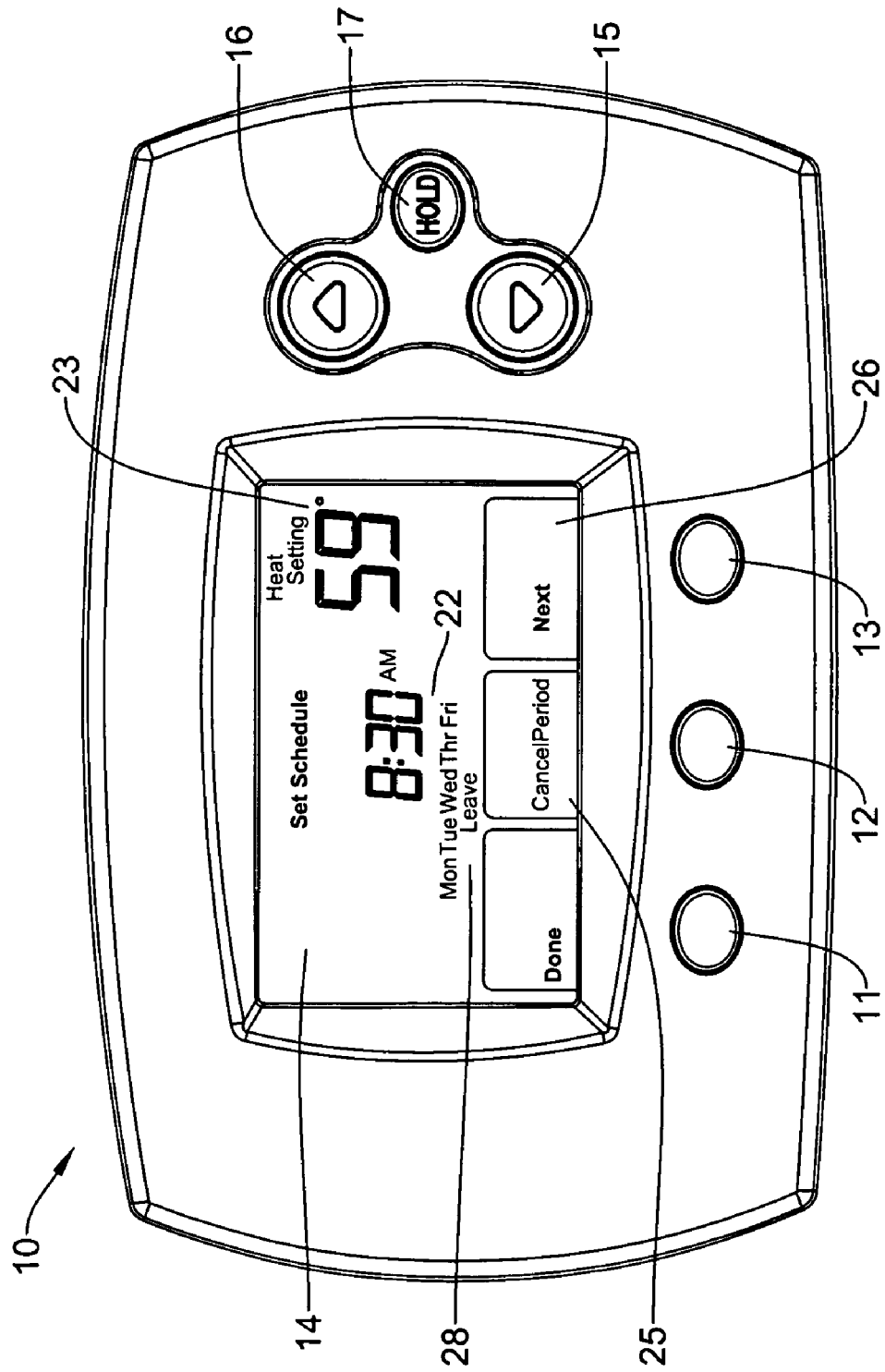
Figure 19:
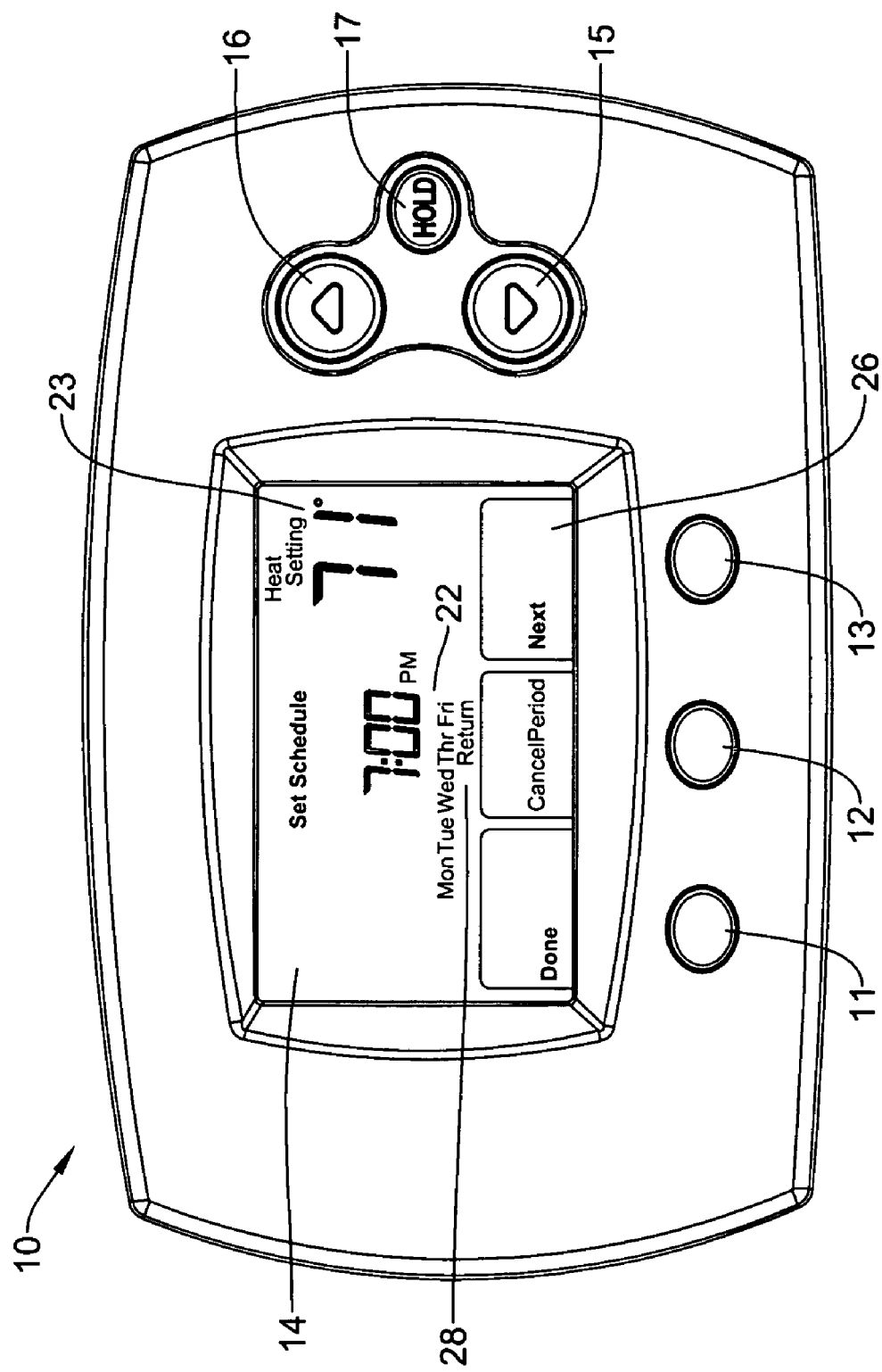
Figure 20:
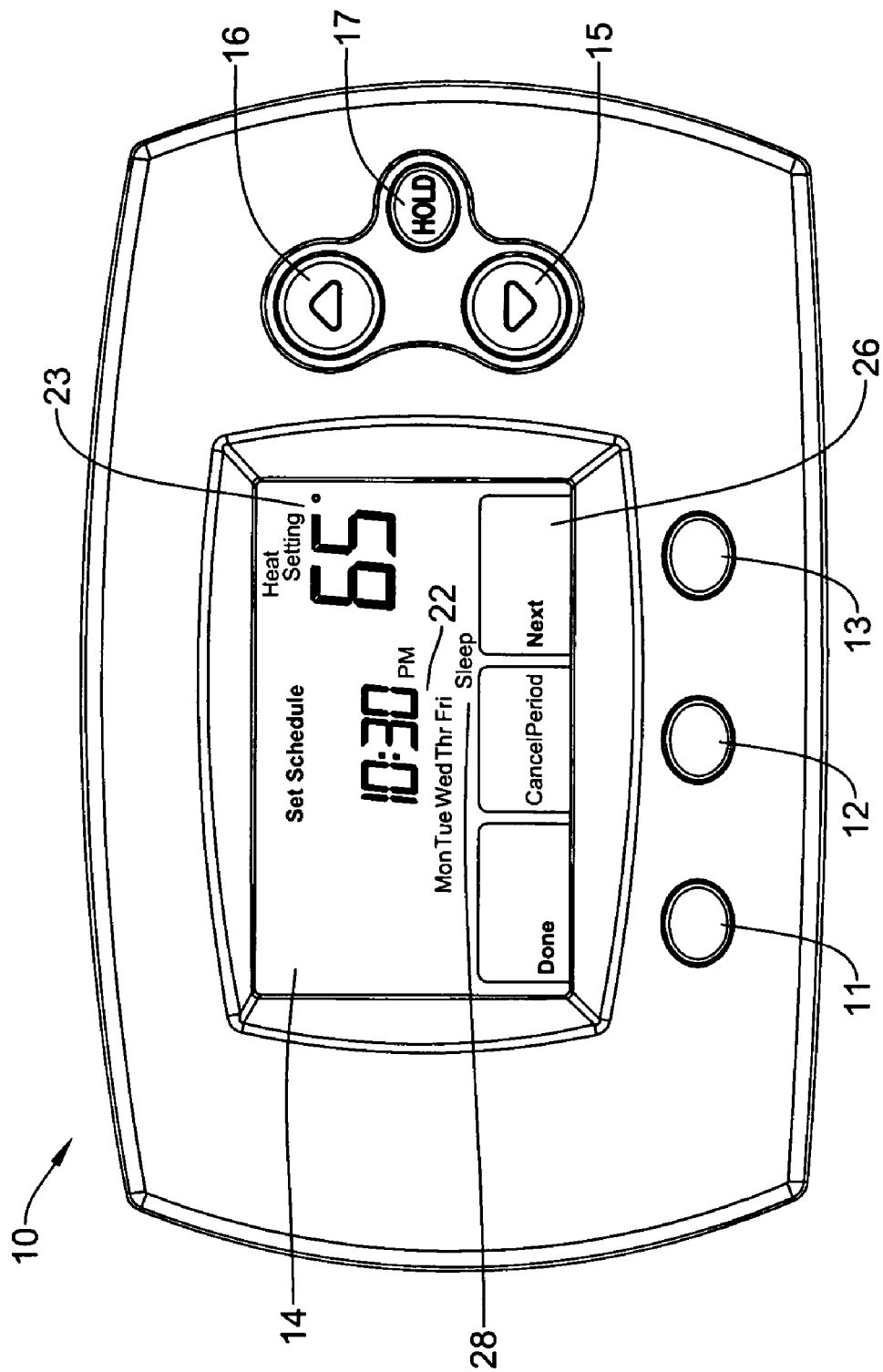

The thermostat 10 may be programmed for maximum energy savings. Four time periods 28 for each day may be programmed, with different settings for weekdays and weekends. There may be more or less than four periods. The four periods may constitute an illustrative example. The four periods 28 may be referred to as "Wake", "Leave", "Return" and "Sleep." The following example settings may be done for weekdays in the "Heat" System. For example, for the "Wake" period 28, the time 22 may be set to the time that an occupant awakens and the temperature 23 for this period 28 may be set until the occupant leaves for the day. FIG. 17 indicates that the temperature 23 may be set for 75 degrees for 6:30 A.M. To move along in the set schedule procedure, the user may press softkey or button 13 under area 26 which indicates "Next". The next period 28 may be the "Leave" period, where the occupant may set the time 22 for leaving the house and the temperature 23 that the occupant wants while away from the house. This setting may be an energy saving level. FIG. 18 indicates that the temperature 23 may be set for 59 degrees for 8:30 A.M. The user may press softkey 12 under area 25 which indicates "Cancel Period" to eliminate unwanted time periods except "Wake". The next period 28 may be the "Return" period, where the occupant returns to the house. This is where the occupant sets the thermostat 10 to the time 22 for when the occupant returns to the house, and sets the temperature 23 that the occupant wants during the evening until bedtime. FIG. 19 shows that the temperature 23 may be set at 71 degrees for the return period 28 starting at 7:00 P.M. The "Sleep" period 28 begins when the occupant goes to bed and wants a temperature 23 set for overnight. The temperature 23 setting may be an energy-saving level. FIG. 20 indicates that the temperature 23 may be set for 65 degrees beginning at 10:30 P.M.

Figure 21:
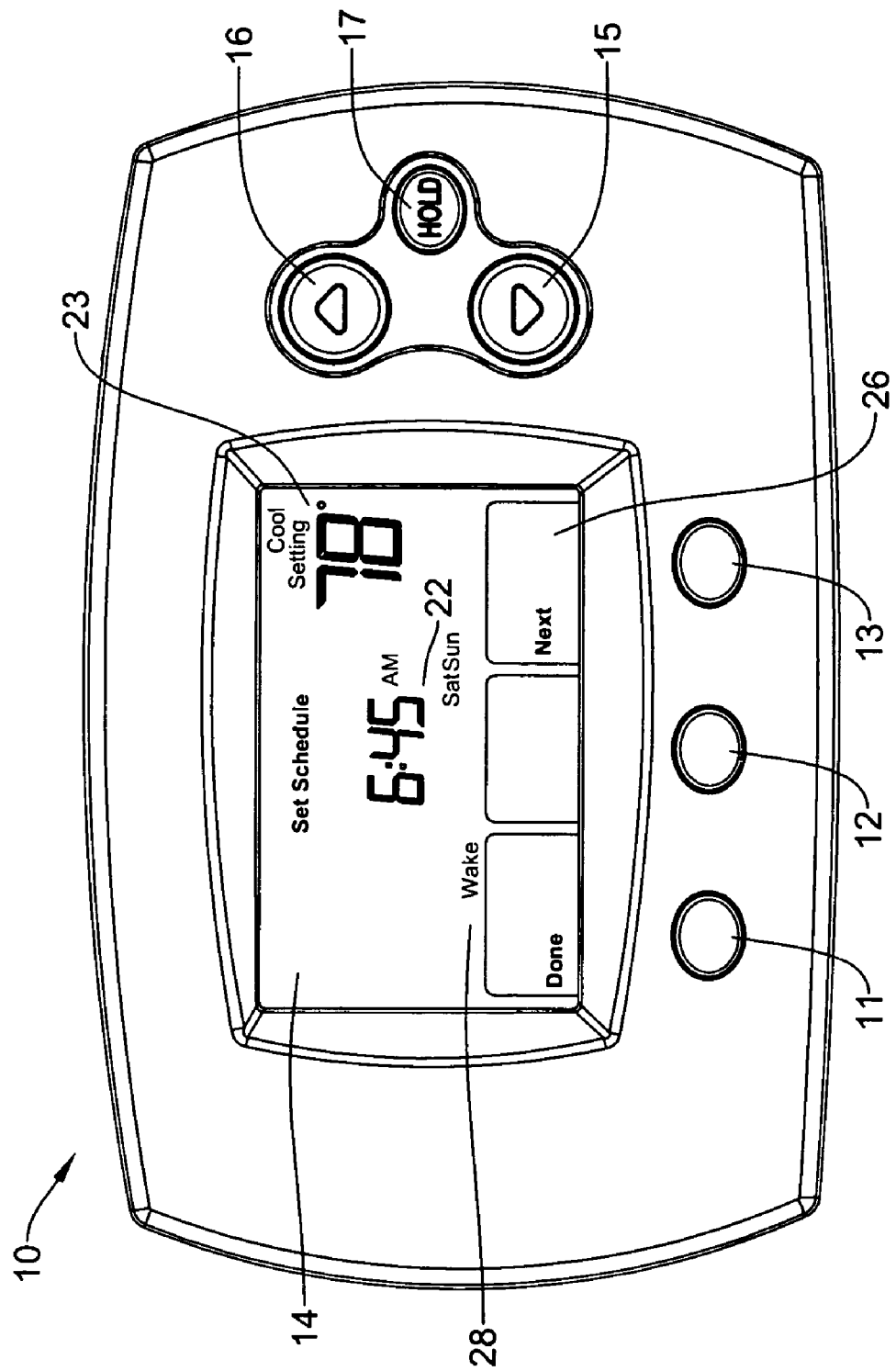
FIG. 21 shows a weekend setting.

Programmed settings may also be done for weekends. Besides the Heat settings, Cool settings 23 may also be done for each of the four periods 28, as was done with Heat settings 23. FIG. 21 is an example of a weekend Cool setting 23 of 78 degrees for a "Wake" period 28 at a time 22 of 6:45 A.M. In some versions of thermostat 10, virtually any number of and/or different periods and temperature settings may be uniquely programmed for individual days of the week, or for one or more, if not all, dates of a week, month or year.

The thermostat 10 may be pre-set to use EnergyStar® program settings for keeping heating and cooling expenses down. The "Wake" period may begin at 6:00 A.M. for weekdays and weekends. The "Heat" may be set at 70 degrees and the "Cool" may be set at 75 degrees. The "Leave" period may begin at 8:00 A.M. for weekdays and weekends. The "Heat" may be set at 62 degrees and the "Cool" at 75 degrees. The "Return" period may begin at 6:00 P.M. for weekdays and weekends. The "Heat" may be set at 70 degrees and the "Cool" at 75 degrees. The "Sleep" period may begin at 10:00 P.M. for weekdays and weekends. The "Heat" may be set at 62 degrees and the "Cool" at 78 degrees. The above-mentioned settings may apply to both weekdays and the weekend. However, one or more settings and/or periods may be canceled for the weekend. The program schedules may be adjusted in a variety of ways as indicated in the present description.

Figure 22:
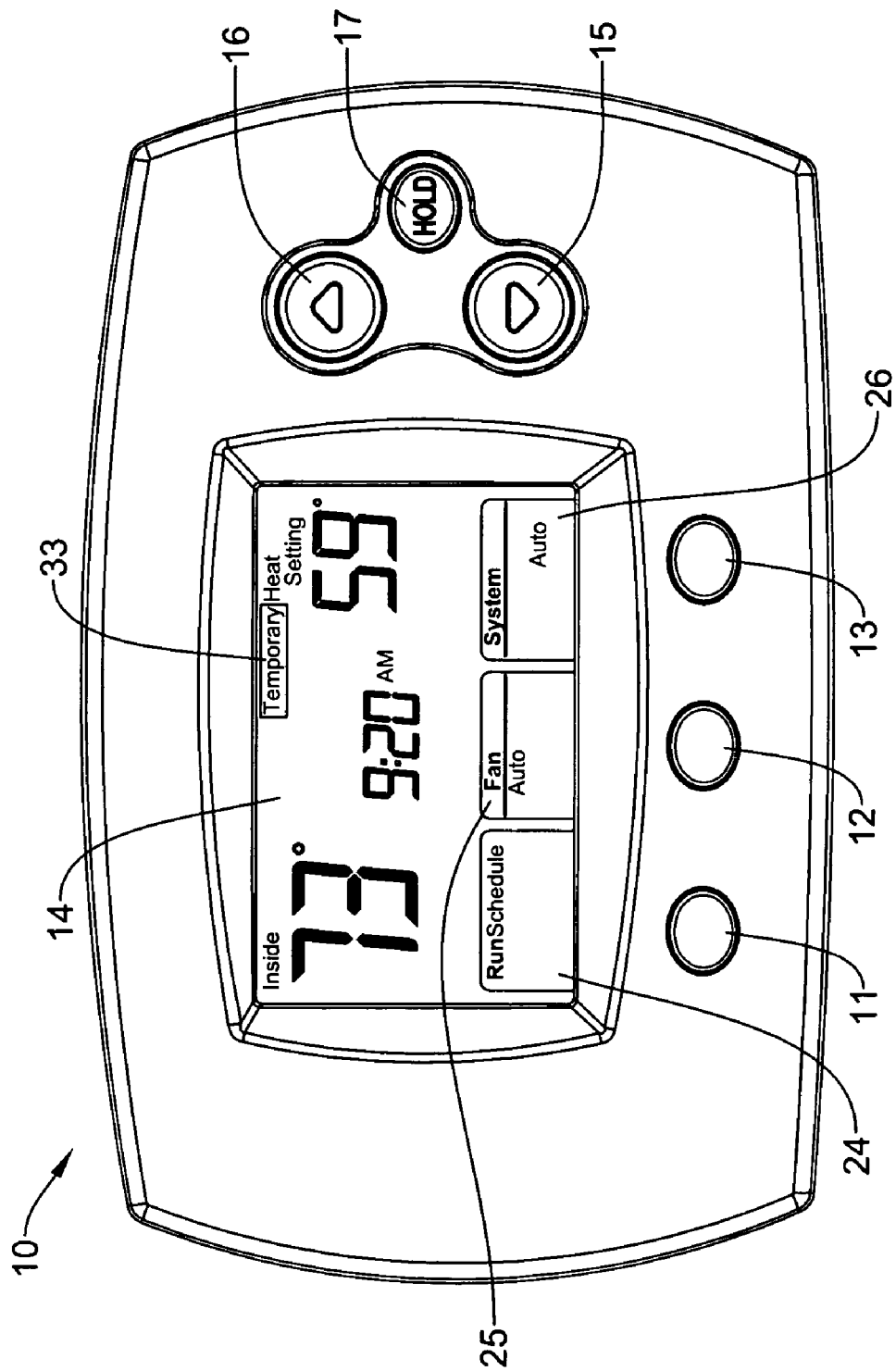
FIG. 22 shows a temporary override setting.

For one reason or another, the user may wish to do a program schedule override in a temporary fashion. To enter the override status, the user may press button 15 or 16 and hold it down for a couple seconds. Then a label 33 showing "Temporary" on the display screen may appear, as shown in FIG. 22. Then the user may adjust the temperature setting with the button 15 or 16 for a desired temperature. This temperature setting may temporarily override the temperature setting for the current time period, whether it be the "Wake," "Leave," "Return" or "Sleep" period. This new temperature may be maintained only until the next programmed time begins. For instance, if the user wants to turn the heat up during the "Wake" period, it will automatically be lowered upon the start of the "Leave" period to the previously set temperature of the latter period. The temporary setting may be cancelled at any time by pressing button 11 with "Run Schedule" showing in area 24, as shown in FIG. 22, and then the "Set Clock/Day/Schedule" label may return to area 24. When setting the thermostat 10, the occupant should assure that the thermostat selection is to the system (e.g., "Heat," "Cool" or "Auto") which is to be controlled.

Figure 23:
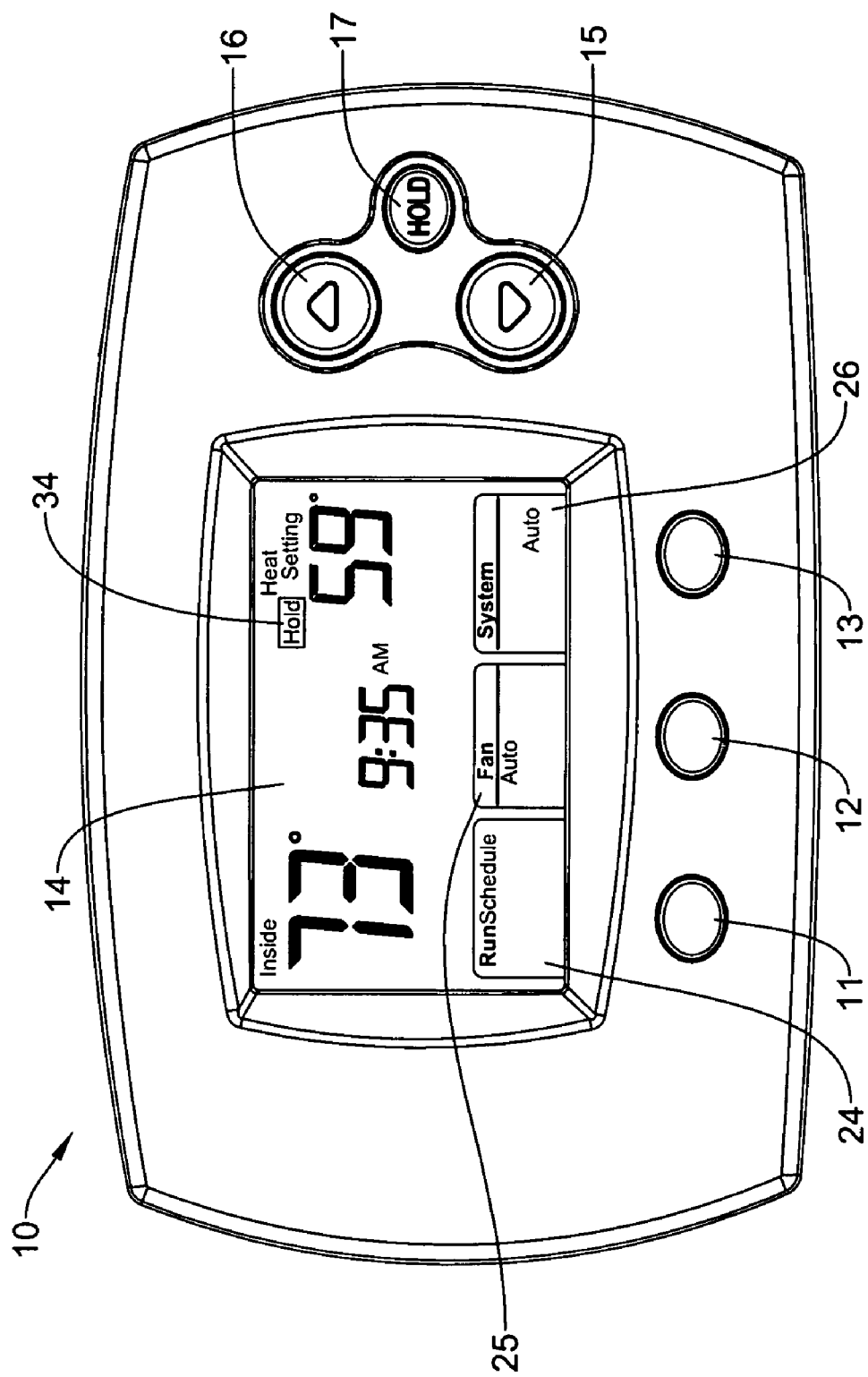
FIG. 23 shows a hold override setting.

The occupant may want to program a schedule override that is permanent. To do so, the occupant may press the "HOLD" button 17 and permanently adjust the temperature. This temperature adjustment may override the temperature settings for all time periods. To do this permanent override, the occupant would first assure that the thermostat 10 is set to the desired system (i.e., Heat, Cool, or Auto) to be controlled. The "HOLD" button 17 may turn off the program schedule and allow the occupant to adjust the thermostat manually, as desired. Whatever temperature is set will be maintained 24 hours a day, until it is manually changed. A "Hold" label 34, shown in FIG. 23, may be present on display 14 when the permanent program schedule override is in effect. To cancel the "Hold," one may go to button 11 under area 24 which says "Run Schedule" and press the button to resume the programmed schedule.

Instead of being in the "Heat" or "Cool" system, thermostat 10 may go from the MCO to the ACO (i.e., the Auto Changeover). The auto changeover may be used in climates where both air conditioning and heating are used on the same day. The system may be set to "Auto" by pressing the button 13 until "Auto" shows up in area 26 as shown in FIG. 22. When the system is set to "Auto," the thermostat 10 may automatically select heating or cooling, depending on the indoor temperature. Heating system and cooling system settings may be at a minimum at least three degrees apart. The thermostat may automatically adjust the settings to maintain the three degree separation (i.e., deadband). However, this separation could be adjusted to another value.

Thermostat 10 may have a built-in compressor protection, which may help prevent damage to the compressor in the associated air conditioning or heat pump system. Damage may occur if the compressor is restarted too soon after shutdown. The compressor may be forced to wait several minutes before restarting. During this wait time, the display 14 may flash a message label 29 "Cool On" or "Heat On" if a heat pump is associated with the system as shown in FIG. 7. When a safe wait time has elapsed, the message label 29 flashing may stop and the compressor may turn on. The location of label 29 is shown in FIG. 7.

The thermostat 10 may have an Adaptive Intelligent Recovery™ (AIR) aspect that may permit the thermostat to "learn" how long the furnace or air conditioner takes to reach the temperature setting. For instance, the user may set the program schedule to the time that the house is to reach the desired temperature. Then the thermostat 10 may turn on the heating or cooling system at an appropriate time before the scheduled time to reach the set temperature at the scheduled time. For example, the user may set the "Wake" time to 6:00 A.M., so that the temperature is at 70 degrees by 6:00 A.M. When the Adaptive Intelligent Recovery™ is in effect, the display 14 of thermostat 10 will display an "In Recovery" label 32, as shown in FIG. 7.

Figure 24:
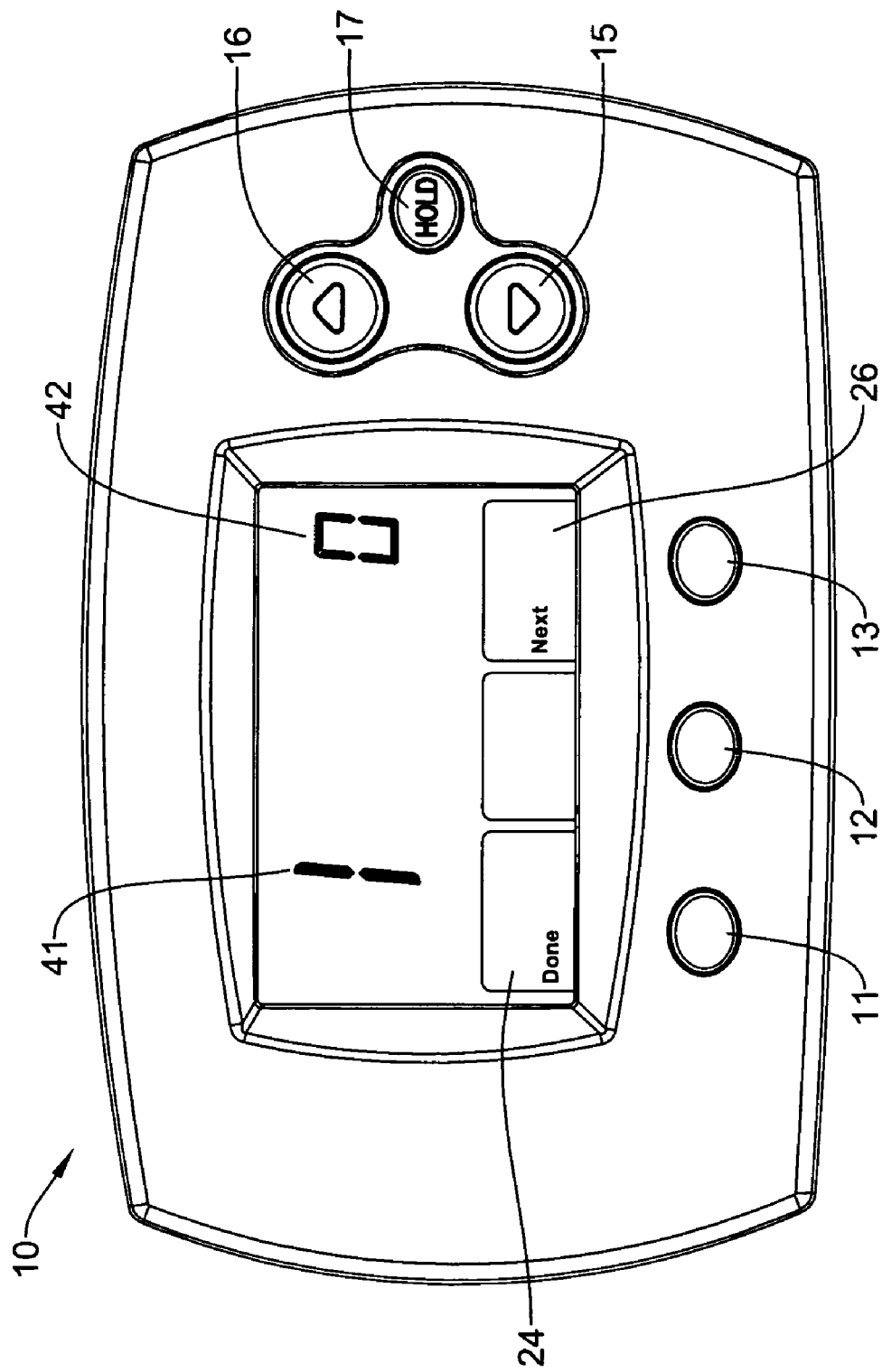
FIG. 24 reveals a system configuration selection mode.
Figure 25:
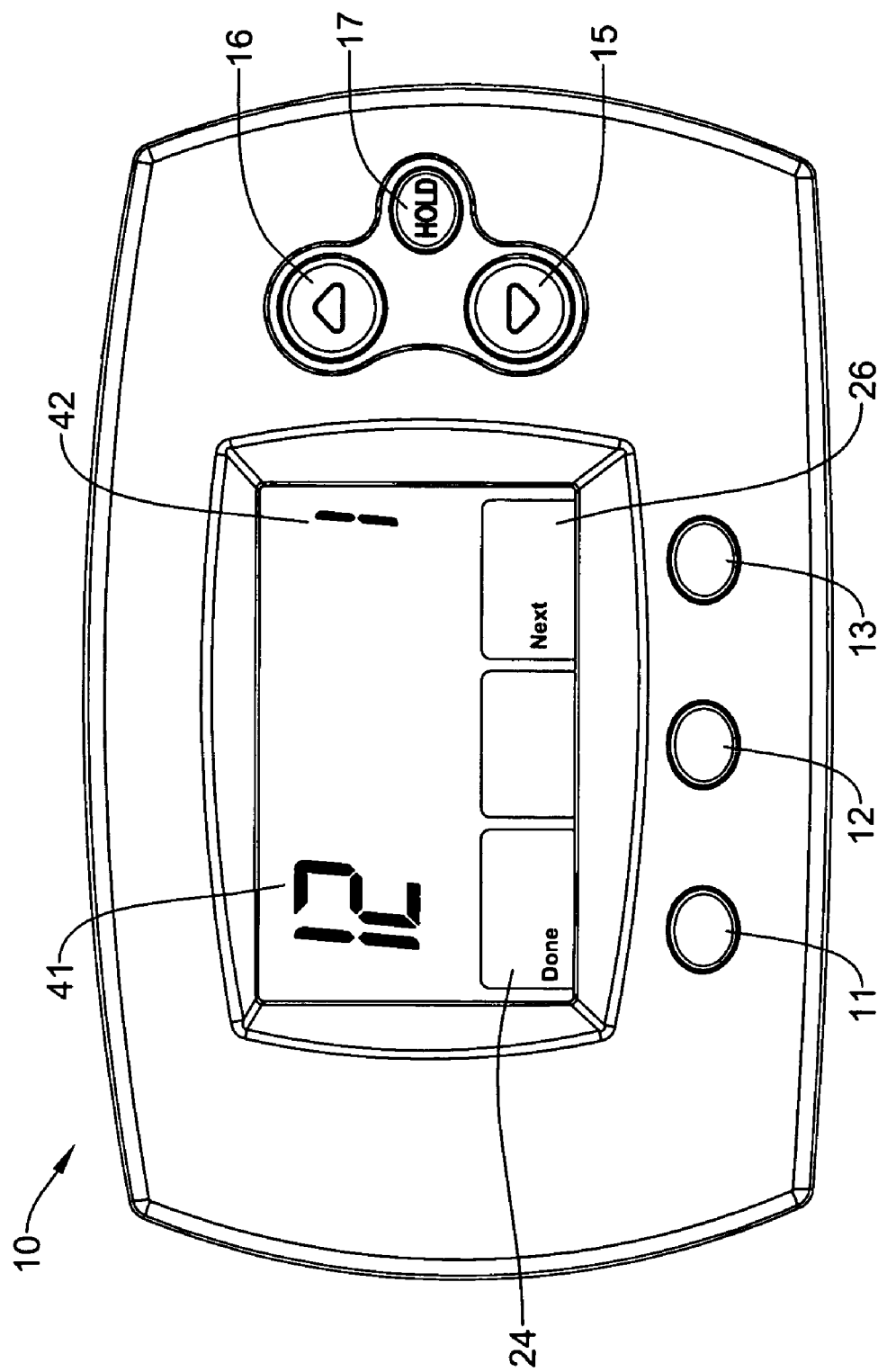
FIG. 25 reveals system options of manual changeover, auto changeover and auto changeover only.

A system configuration may be selected for the thermostat 10. Buttons 12 and 16 may be pressed together for about 4 seconds to enter the configuration mode. Numeral placeholder 41 may show a number that represents a set up category for a system that the thermostat 10 may control. Numeral placeholder 42 may show a number that represents a category option. For instance, when entering the configuration mode, a number "1" may appear in the placeholder 41, which refers to a system type, as shown in FIG. 24. A number "0" may appear in the placeholder 42, which refers to a standard heating cooling setup. The category option "0" may be a default value for the set up category "1". Set up category "1" may have other category options including "1" (heat pump), "2" (heat only), "3" (heat only with fan), "4" (cool only), "5" (two heat, one cool, heat pump), "6" (two heat, two cool, conventional), "7" (two heat, one cool, conventional), and "8" (one heat, two cool, conventional). If button 13 under area 26 with "Next" is pressed one or more times, a set up category number "12" may appear in placeholder 41, as shown in FIG. 25. Number "12" may represent an "Auto Changeover" category. The category options indicated in placeholder may include "0" (manual changeover), "1" (auto changeover), and "3" (auto changeover only). Numerous other set up categories and category options designated by other numbers in placeholders 41 and 42, respectively, may be designed into thermostat 10 as desired. The configuration mode may be exited by pressing button 11 under area 24 indicating "Done".

Figure 26:
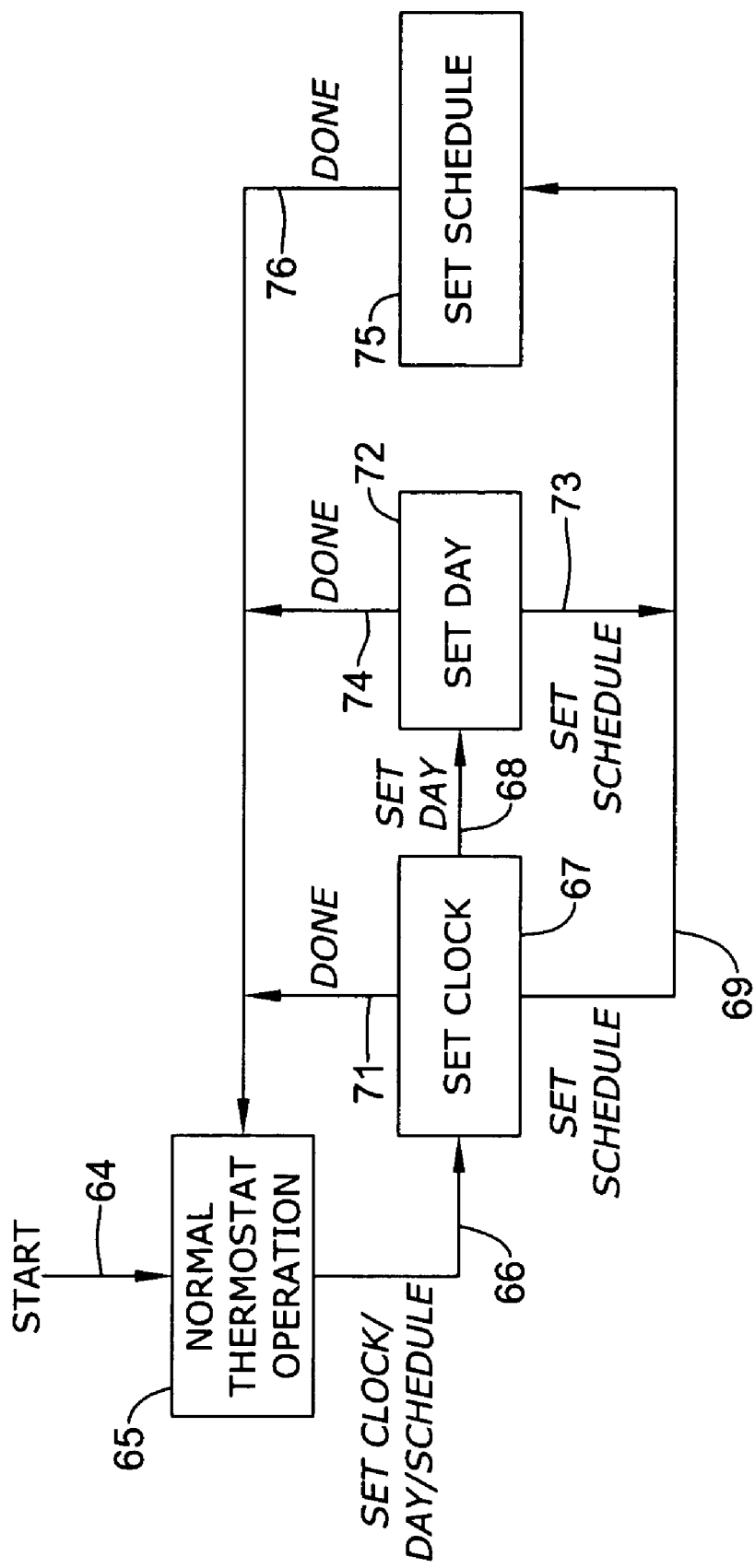
FIG. 26 is a flow diagram for setting the clock, day and schedule of the thermostat system.

FIG. 26 shows a flow diagram for setting a clock, day and schedule of the programmable thermostat. The legend for this Figure has boxes representing main menus and the italic text representing softkey options. A start 64 may result in a normal thermostat operation menu 65. Pressing a softkey option proximate to a set clock/day/schedule 66 indication may lead to a set clock menu 67. After the clock is set or checked, an option to set 68 the date, set 69 the schedule, or select done 71, may be selected with the softkey. The set day menu 72 may be selected via option 68. Upon setting or checking the day, then an option to set 73 the schedule or select done may be effected with the softkey. The set schedule menu 75 may be selected via option 73. Upon setting the schedule with menu 75, then the done softkey option 76 may be selected.

Figure 27:
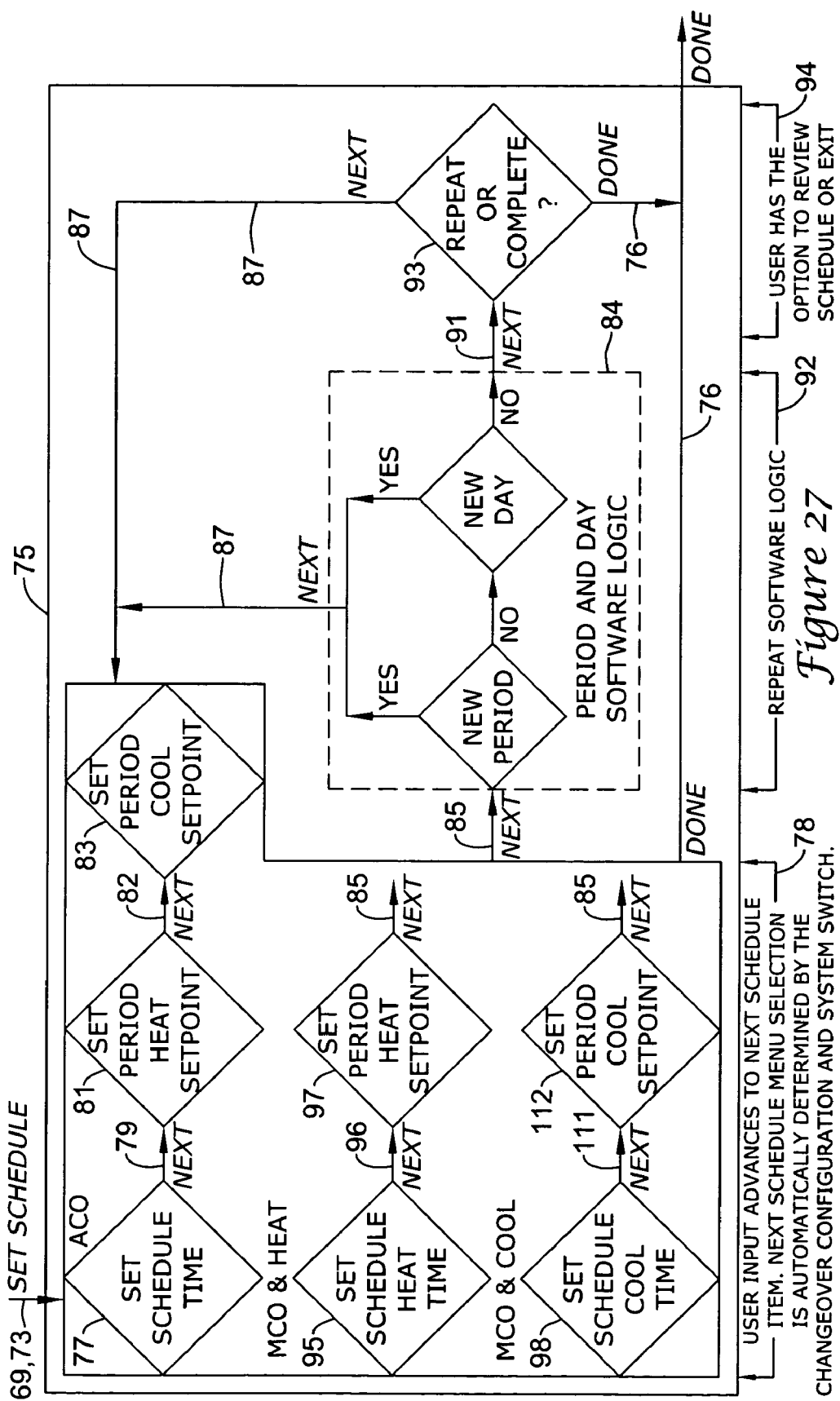
FIG. 27 is a flow diagram for the set a single schedule procedure.

The set schedule menu 75 is shown in FIG. 27. Softkey options are shown in italic text and menus in diamonds. A softkey selection 69, 73 may provide a set schedule time item 77 for the first period, depending on changeover configuration and system switch setting. Range 78 may cover the different schedule setting/viewing options. The different schedule options may be for auto changeover, manual changeover with system switch in heat, and manual changeover with system switch in cool (or off). A schedule menu selection may automatically be determined by the changeover configuration and system switch.

The user may select the softkey next option to advance to the next menu item or select the softkey done option to exit the schedule menu. For the Auto changeover schedule option, upon completion of item 77, setting the period time, a user may select the done softkey option 76 or a next softkey option 79. The latter may be selected to continue the set schedule procedure. The next item 81 may be to set the period heat setpoint. Option 76 may be selected to be done or option 82 may be selected to go to the next item 83 to set the period cool setpoint. Option 76 may be selected to be done or the next item 85 may be selected to advance to item 84, period and day repeat software logic. For the manual changeover with system switch in heat schedule option, upon completion of setting the heat period time, item 95, a user may select the done softkey option 76 or a next softkey option 96. The next item 97 may be to set the period heat setpoint. Option 76 may be selected to be done or the next item 85 may be selected to advance to item 84, period and day repeat software logic. For the manual changeover with system switch in cool (or off) schedule option, upon completion of setting the cool period time, item 98, a user may select the done softkey option 76 or a next softkey option 111. The next item 112 may be to set the period cool setpoint. Option 76 may be selected to be done or the next item 85 may be selected to advance to item 84, the period and day repeat software logic. Upon completion of range 78, the done option 76 may be selected to exit the set schedule menu or a next option 85 may be selected which leads to the automatic new period and day software logic item 84. The period and day software logic 84 may automatically advance the user to repeat the range 78 via path 87 with a new period and/or day, or to advance to range 94. The period and day software logic 84 may repeat range 78 for each period and day of the schedule. Upon completion of the period and day software logic 84, hence having completed all periods and days, the next item 91 (same user action as item 85) may advance the user to item 93, the repeat or complete user option. Range 94 may indicate that the user has the option to review the schedule or exit. To review or repeat the schedule through range 78 and range 92, option 87 may be selected. If complete, then the done option 76 may be selected to return to the normal thermostat operation 65 of FIG. 26.

Figure 28:
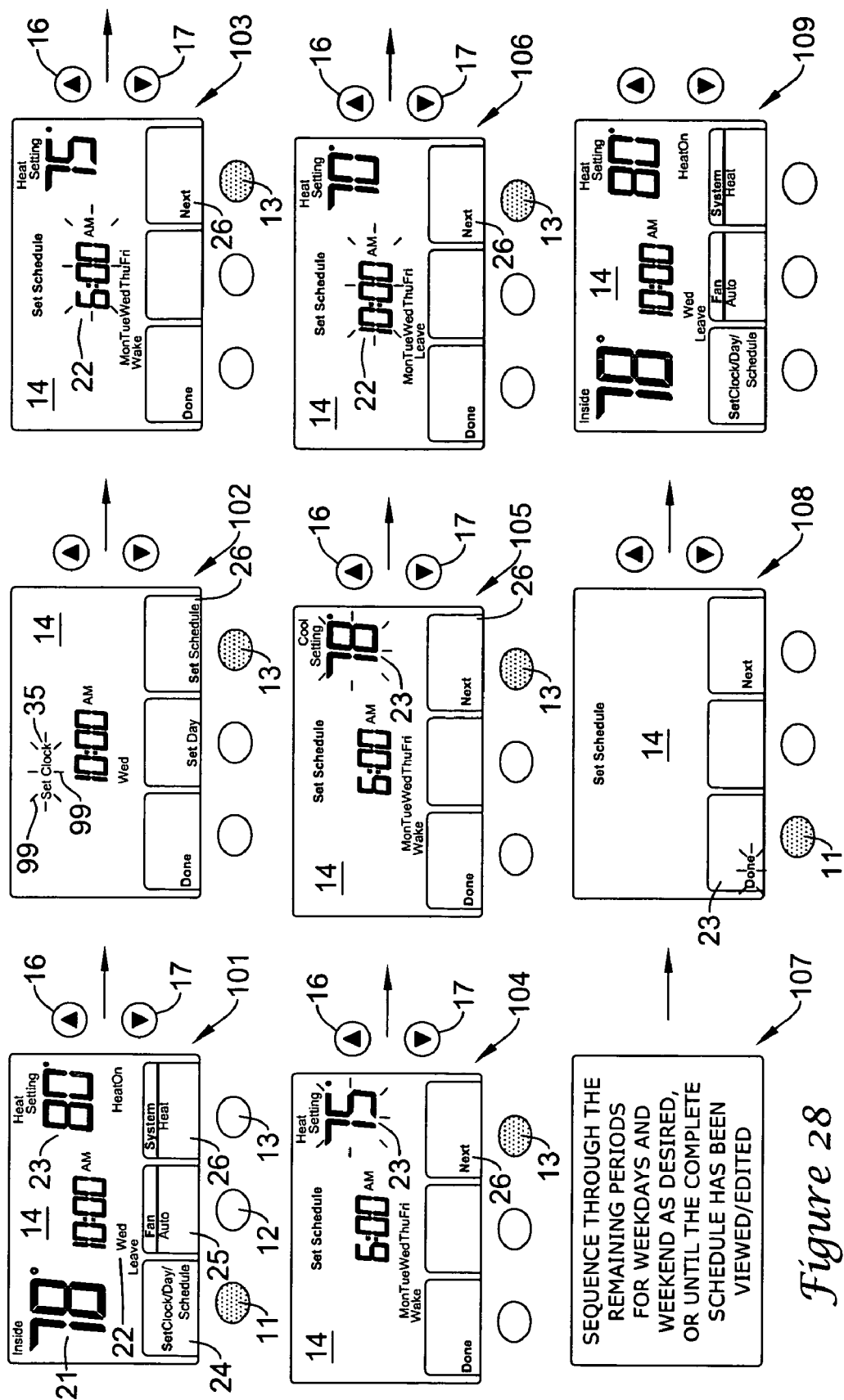
FIG. 28 is a menu storyboard diagram for clock and schedule settings.

FIG. 28 is a clock and auto changeover schedule storyboard of illustrations 101-109. System 10 is easily programmable with sequential programming having a minimally small number of steps. A user may advance a menu by pressing a softkey 13 or modify a setting by pressing up/down keys 16 and 17. Illustration 101 shows a home screen 14 at normal operation. It shows the inside temperature 21, day and time 22, temperature setting 23, menus 24, 25 and 26 corresponding to softkeys 11, 12 and 13, respectively. Pressing softkey 11 under menu 24 showing "Set Clock/Day/Schedule" in illustration 101 may lead to screen 14 in illustration 102, with a flashing "Set Clock" label segments 35, as depicted with short marks 99 radially extending out from the encircled label 35. These marks may indicate flashing of the segments which they are associated with also in other illustrations. Here the clock or time indication 22 may be advanced with an up (arrow) button or key 16 or backed up with a down (arrow) button or key 17.

After the clock is set, button 13 under menu 26 showing "Set Schedule" may be pressed to get illustration 103 of the screen 14. It shows flashing segments of clock 22 with a time for a start of the Wake period. Key 16 or 17 may be pressed to set the time. Softkey 13 under menu 26 that shows "Next" may be pressed to get a screen 14 as shown in illustration 104. That screen 14 may show flashing segments for a heat temperature setpoint 23. Temperature setpoint 23 may be adjusted or set by pressing key 16 or 17. After the heat temperature setpoint 23 is adjusted, softkey 13 under menu 26 indicating "Next" may be pressed to get illustration 105 of a screen 14 that shows flashing segments for a cool temperature setpoint 23. The cool temperature setpoint may be adjusted or set by pressing adjustment key 16 or 17.

After the cool temperature setpoint is adjusted, softkey 13 under menu 26 indicating "Next" may be pressed to get illustration 106 which shows the screen 14 with flashing segments of clock 22 with a start time for the Leave period. The time may be set with keys 16 and 17, as done for the Wake period. The temperature setpoints 23 may be similarly set. The user may sequence through the periods for weekdays and the weekend, as desired, until the complete schedule has been viewed or edited, as indicated in illustration 107. There may be four periods, Wake, Leave, Return and Sleep, as noted at other places of this description. At any point of the set schedule procedure, the user may press a softkey 11 under menu 24, which indicates "Done", and return to the home screen 14 normal operation. However, if the user proceeds to complete the set schedule procedure, a screen 14 as shown in illustration 108 may appear. The screen of illustration 108 may show flashing segments of "Done" in menu 24 to indicate completion of the procedure. The user may then press softkey 11 to get the screen 14 of illustration 109 showing the home screen normal operation.

When going through the period and temperature settings, as in the storyboard illustrations 101-109, one may be permitted to make both heat and cool settings if the system 10 is set in menu 26 to "Heat", "Cool", "Auto" or "Off" for "auto changeover", or to "Auto" for "auto changeover only". "Auto" might be the only system selection available in menu 26 for "auto changeover only". One might be permitted to make only heat settings for a system selection of "Heat", only cool settings for a system selection of "Cool", and only cool settings for a system selection of "Off" in menu 26 when system 10 in manual changeover. However, thermostat system 10 may be designed and/or programmed, as desired, to consist of variants of the noted configurations, modes and settings, in this paragraph, such as editing schedules from any mode or system selection, and in other places of the present description.

A system may be designed similar to system 10 but without being programmable. However, such non-programmable thermostat system may also have a selectable "auto only" configuration that does not have a system selection of "Off". Both systems may benefit with the "auto only" aspect, in that a system cannot be switched off, for instance, accidentally by adults or by children playing with the system. This may prevent misery to a challenged person unable to switch on or control the system in exceptionally hot weather, or avoid damage to a water system of a house that is left unoccupied for a period of time in a cold climate. There are other mishaps which the "auto only" aspect of the thermostat system may avoid or prevent.

The programming, scheduling, settings, modes, configuration option selections, and the like, described herein may be performed by a user on a thermostat system 10 in an armchair.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A controller system comprising:
    a heat schedule;
    a cool schedule;
    an automatic changeover;
    an automatic only changeover; and
    a manual changeover; and
    wherein for a manual changeover either the heat or cool schedule is automatically selected from the heat and cool schedule group for the controller system based on whether the manual changeover is set to heat or cool, respectively,
    wherein when the automatic only changeover is selected, the controller system cannot be turned off.

2. The system of claim 1, wherein:
    the heat schedule comprises a plurality of heat temperature setpoints;
    the cooling schedule comprises a plurality of cool temperature setpoints;
    each heat temperature setpoint has an associated heat time setpoint; and
    each cool temperature setpoint has an associated cool time setpoint.

3. The system of claim 1, wherein the heat schedule and the cool schedule may be edited with the controller system disconnected from another system that the controller system is to control.

4. The system of claim 2, wherein each time setpoint is a beginning of a time period and an end of previous period if preceded by the previous time period.

5. The system of claim 2, further comprising:
a heat/cool schedule; and
wherein the heat/cool schedule is a combining of the plurality of heat setpoints and the plurality of cool setpoints.

6. The system of claim 5, wherein the automatic changeover is a selection of the heat/cool schedule for the controller system in lieu of a heating schedule or a cooling schedule.

7. The system of claim 5, wherein the heat/cool schedule may be edited with the controller system disconnected from another system that is to be controlled by the controller system.

8. A method for programming a controller system comprising:
loading a heat schedule into the controller system;
loading a cool schedule into the controller system;
selecting one of the heat and cool schedules for the controller system to implement; and
editing the selected heat or cool schedule, wherein a user is prevented from editing a non-selected heat or cool schedule.

9. The method of claim 8, wherein selecting one of the heat and cool schedules is a manual changeover configuration.

10. The method of claim 9, further comprising:
combining the heat schedule and the cool schedule in to a heat/cool schedule; wherein selecting the heat/cool schedule is an auto changeover configuration, wherein when the auto changeover configuration is selected, a user is prevented from turning off the controller system.

11. The method of claim 10, further comprising:
editing the heat schedule and/or cool schedule; and
wherein the editing of the heat schedule and/or the cool schedule may be performed on the controller system with the controller system disconnected from another system to be controlled by the controller system.

* * * * *